US008665496B2

(12) United States Patent
Hasegawa et al.

(10) Patent No.: US 8,665,496 B2
(45) Date of Patent: Mar. 4, 2014

(54) CONTROL DEVICE, LASER PROJECTION DEVICE, RECORDING METHOD, COMPUTER PROGRAM, AND RECORDING MEDIUM

(75) Inventors: Fumihiro Hasegawa, Tokyo (JP); Tomomi Ishimi, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 469 days.

(21) Appl. No.: 13/131,042

(22) PCT Filed: Nov. 25, 2009

(86) PCT No.: PCT/JP2009/070211
§ 371 (c)(1),
(2), (4) Date: May 25, 2011

(87) PCT Pub. No.: WO2010/064639
PCT Pub. Date: Jun. 10, 2010

(65) Prior Publication Data

US 2011/0235134 A1 Sep. 29, 2011

(30) Foreign Application Priority Data

Dec. 3, 2008 (JP) ................................ 2008-308956
Oct. 9, 2009 (JP) ................................ 2009-235614

(51) Int. Cl.
*G06K 15/02* (2006.01)

(52) U.S. Cl.
USPC ............ 358/3.11; 358/1.3; 358/1.5; 358/1.7; 358/1.12; 358/503; 503/201; 347/179; 347/224; 359/212.1; 359/196.1

(58) Field of Classification Search
None
See application file for complete search history.

(56) References Cited

U.S. PATENT DOCUMENTS 5,208,901 A * 5/1993 Sasaki et al. ................. 358/1.18
5,852,680 A * 12/1998 Yoshida ........................ 382/258

(Continued)

FOREIGN PATENT DOCUMENTS

EP 1 834 795 9/2007
EP 1 897 695 3/2008

(Continued)

OTHER PUBLICATIONS

International Search Report issued Feb. 23, 2010 in PCT/JP09/70211 filed Nov. 25, 2009.

*Primary Examiner* — King Poon
*Assistant Examiner* — Ted Barnes
(74) *Attorney, Agent, or Firm* — Oblon, Spivak, McClelland, Maier & Neustadt, L.L.P.

(57) ABSTRACT

A control device includes a shape information storage storing shape information to be plotted, a stroke generation unit generating first and second stroke data having transmission start and end coordinates of first and second strokes, a scanning start time computation unit determining scanning start time of the second stroke by adjusting, when selecting first and second points having a shortest distance, a waiting time to scan the second stroke, a traveling rate from the transmission end coordinates of the first stroke to the transmission start coordinates of the second stroke, and scanning rates of scanning the first and second strokes to have a desired time interval between the selected points, a plotting instruction generation unit generating plotting instructions including the scanning start time of the second stroke and the transmission start and end coordinates of the first and second strokes, a plotting instruction storage storing the plotting instructions, and a plotting instruction execution unit executing the plotting instructions.

16 Claims, 32 Drawing Sheets

(56) References Cited

U.S. PATENT DOCUMENTS

| | | | | |
|---|---|---|---|---|
| 6,102,593 | A * | 8/2000 | Brewington et al. | 400/120.01 |
| 7,463,395 | B2 * | 12/2008 | Utagawa et al. | 359/212.1 |
| 8,106,934 | B2 * | 1/2012 | Ishimi et al. | 347/224 |
| 2006/0082612 | A1 | 4/2006 | Morikawa et al. | |
| 2006/0221424 | A1 * | 10/2006 | Utagawa et al. | 359/212 |
| 2007/0176804 | A1 * | 8/2007 | Abe et al. | 341/84 |
| 2007/0225162 | A1 * | 9/2007 | Kawahara et al. | 503/201 |
| 2007/0285488 | A1 * | 12/2007 | Ishimi et al. | 347/179 |
| 2008/0064596 | A1 * | 3/2008 | Iino et al. | 503/201 |
| 2008/0068384 | A1 * | 3/2008 | Achong et al. | 345/472 |
| 2008/0151033 | A1 * | 6/2008 | Ishimi et al. | 347/179 |
| 2008/0153698 | A1 * | 6/2008 | Kawahara et al. | 503/201 |
| 2008/0214391 | A1 * | 9/2008 | Kawahara et al. | 503/201 |
| 2008/0248401 | A1 * | 10/2008 | Mizukami et al. | 430/2 |
| 2010/0039916 | A1 * | 2/2010 | Hasegawa et al. | 369/100 |

FOREIGN PATENT DOCUMENTS

| | | |
|---|---|---|
| JP | 2000 229427 | 8/2000 |
| JP | 2004 90026 | 3/2004 |
| JP | 2004 341373 | 12/2004 |
| JP | 2004 345273 | 12/2004 |
| JP | 3 990 891 | 7/2007 |
| JP | 2008 62506 | 3/2008 |
| JP | 2011 25647 | 2/2011 |

* cited by examiner

FIG.4

FIRST STROKE

| |
|---|
| t : STROKE WIDTH |
| u : TRAVELING RATE |
| v : SCANNING RATE |
| m: SCANNING START POINT |
| d : SCANNING END POINT |

SECOND STROKE

| |
|---|
| t : STROKE WIDTH |
| u : TRAVELING RATE |
| v : SCANNING RATE |
| wa : WAITING TIME |
| m : SCANNING START POINT |
| d : SCANNING END POINT |

THIRD STROKE

| |
|---|
| t : STROKE WIDTH |
| u : TRAVELING RATE |
| v : SCANNING RATE |
| wa : WAITING TIME |
| m : SCANNING START POINT |
| d : SCANNING END POINT |

$$\nu = \frac{\text{STROKE LENGTH S}}{\text{T1+Tin}} = \frac{\text{STROKE LENGTH S}}{\text{RESIDUAL HEAT WAITING TIME} - \text{T0}}$$

IF DISTANCE L < THRESHOLD, THEN SET WAITING wb TO PLOTTING INSTRUCTIONS
(THRESHOLD = RESIDUAL HEAT WAITING TIME * TRAVELING RATE u)

FIG.17A

FIRST STROKE

| |
|---|
| t : STROKED WIDTH |
| u : TRAVELING RATE |
| v : SCANNING RATE |
| m : (48,48) |
| d : (80,48) |

SECOND STROKE

| |
|---|
| wb : 50 |
| m : (112,48) |
| d : (112,448) |

THIRD STROKE

| |
|---|
| wb : 50 |
| m : (80,400) |
| d : (48,352) |

FOURTH STROKE

| |
|---|
| m : (144,48) |
| d : (176,48) |

FIG.17B

FIRST STROKE

| |
|---|
| t : STROKED WIDTH |
| u : TRAVELING RATE |
| v : SCANNING RATE |
| m : (48,48) |
| d : (80,48) |

SECOND STROKE

| |
|---|
| wb : 50 |
| m : (112,48) |
| d : (112,448) |

THIRD STROKE

| |
|---|
| wb : 50 |
| m : (80,400) |
| d : (48,352) |

FOURTH STROKE

| |
|---|
| wb : 50 |
| m : (144,48) |
| d : (176,48) |

CONTROL DEVICE, LASER PROJECTION DEVICE, RECORDING METHOD, COMPUTER PROGRAM, AND RECORDING MEDIUM

TECHNICAL FIELD

The present invention generally relates to a control device for controlling a plotting device that plots line images such as characters or raster images in a contact or non-contact manner. More specifically, the present invention relates to a control device for controlling a plotting device capable of reducing an amount of damage on a surface of a recording material even if information is repeatedly recorded on or erased from the surface of the recording material, a laser projection device including the control device, a recording method for reducing the amount of damage on a surface of a recording material, a computer program product for executing the recording method, and a recording medium containing the computer program.

BACKGROUND ART

Laser projection devices (laser markers) that thermally mark characters and symbols on materials are commercially available. Specifically, such laser projection devices generally incorporate a technology in which a material absorbs, on exposure to a laser beam, the laser beam to generate heat and the generated heat changes colors of the exposed portion of material, thereby recording characters and symbols on the material.

Examples of a laser light source of the laser projection device include a gas laser, a solid-state laser, a liquid laser, and a semiconductor laser, and characters and symbols are marked, based on oscillation wavelengths of the exposed lasers, on materials such as metallic or plastic media, heat-sensitive paper, and thermal rewritable media.

In the metallic or plastic media, heat generated upon laser projection engraves or singes surfaces of the media, thereby marking characters and symbols on the media. Meanwhile, in the heat-sensitive paper or thermal rewritable media, heat generated upon laser projection causes recording layers of the media to generate colors, thereby printing characters and symbols on the media.

The heat-sensitive paper may also be used as media on which destinations or names of articles are printed. For example, such heat-sensitive media are attached to plastic containers to be used as tags in factories. Since heat-sensitive media including the heat-sensitive paper have a discoloring property due to heat, characters and symbols are written on the media by a thermal head.

Recently, a rewritable type of heat-sensitive paper has been made available to the public, so that characters and symbols can now be repeatedly recorded on and erased from the rewritable heat-sensitive paper. It is preferable that such heat-sensitive paper attached to a container be rewritable without removing it from the container in a physical distribution service. Japanese Laid-Open Patent Application No. 2004-90026, for example, discloses a technology in which characters are printed on desired media in a non-contact manner by laser projection. In this technology, desired characters are printed on the desired media in a non-contact manner by laser projection that causes the surfaces of the media to generate heat. This application also discloses a relay lens system composed of pluralities of lens systems and flexible joints. In the disclosed relay lens system, images formed by laser projection via one end of the relay lens system are transmitted to the other end.

Note that forming images by laser projection is a well-known technology and disclosed, for example, in Japanese Laid-Open Patent Application No. 2004-341373. Japanese Laid-Open Patent Application No. 2004-341373 discloses an image forming technology in which an original image data unit is divided into plural lines and each line of the divided images are formed on a photosensitive drum by laser projection.

Note that colors on the thermal rewritable media disappear at a certain temperature but reappear by further increasing the temperature. However, when excessive heat is applied to the thermal rewritable media, the properties may be altered to cause degradation, such as a decrease in service life-span of the media or incomplete erasure of characters or images from the media.

Some portions of the medium may, when recording a certain image on the medium, easily acquire the excessive heat. For example, there is a case where a certain enclosed region of the thermal rewritable medium is raster scanned (solidly shaded by scanning). FIG. 26A is a diagram illustrating raster scanning an enclosed region. A laser beam is applied in an enclosed region of the thermal rewritable medium by gradually shifting an origin (i.e., scanning start point), and sweeps horizontally left-to-right at a steady rate. The enclosed region of the thermal rewritable medium exposed to the laser beam generates heat, and the solidly shaded region is obtained. Hereafter, projecting a stroke of laser is also simply called "scanning" or "scanning a stroke". The enclosed region is solidly shaded by sequentially scanning from the top line to the bottom line without any gap between the lines.

For example, in FIG. 26A, the line II is scanned after the scanning of the line I without a gap between the lines I and II. However, if the line II is scanned immediately after the scanning of I, the line II is being scanned while the line I just scanned still has residual heat of a laser beam. Thus, the temperature of thermally overlapped regions of the lines I and II may exceed the temperature specified by the specification of the thermal rewritable medium. In this case, the structure of the molecules of the thermal rewritable medium may be damaged due to thermal denaturation, thereby exhibiting an adverse effect on the thermal rewritable medium, such as inability to erase recorded matter.

Japanese Laid-Open Patent Application No. 2008-208681, for example, discloses a technology to control the scanning positions of the lines I and II so as not to create the aforementioned thermally overlapped regions of the lines I and II. However, Japanese Laid-Open Patent Application No. 2008-208631 does not disclose a technology to eliminate thermal overlaps between the two parallel strokes. It is difficult to control the scanning positions without creating thermally overlapped regions of the lines I and II and to display colors without creating any gaps between the lines I and II.

Japanese Patent No. 3990891 discloses a technology for preventing the adverse effect due to residual heat, in which time or amount of laser projection is reduced while a laser beam is scanning the line II. However, similar to the case of controlling the scanning positions of the line I and II, the reduction of time or the reduction of amount of laser projection generates a gap between the lines I and II.

Japanese Laid-Open Patent Application No. 2008-62506 discloses a technology to overcome such a drawback by controlling time between the strokes while laser beams are scanning the two parallel lines. Specifically, Japanese Laid-Open Patent Application No. 2008-62506 discloses the technology to control the time between a start of scanning a preceding stroke of the line I and an end of scanning a subsequent stroke of the line II. In this manner, since the subsequent stroke of the line II is scanned after residual heat of the line I caused by the preceding stroke has been cooled, the adverse effect on the thermal rewritable medium may be prevented.

However, there may still be observed the adverse effect on the thermal rewritable medium with the technology disclosed in the Japanese Laid-Open Patent Application No. 2008-62506. FIG. 26B illustrates such a case where the stroke of the line I is shorter than the stroke of the line II in raster scanning. With this technology in which only the time between the scanning of the two strokes is controlled, even though there is a sufficient time in total for scanning the two strokes of the respective line I and II, the scanning of the stroke of the line II may have started without having a sufficient cooling time after the scanning of the short stroke of the line I has been completed. That is, since time to scan the stroke of the line I is short, the line II can be scanned while the region around the scanned line I still has residual heat. Accordingly, there may be the thermally overlapped regions of the lines I and II which exceed the temperature specification of the thermal rewritable medium.

In addition, in this disclosed technology, interference due to residual heat may also occur between proximate strokes, that is, between strokes that are not parallel to each other. FIG. 27 is a diagram illustrating residual heat interference generated in scanning stroke-based fonts. In scanning a font-based stroke in the order and in directions illustrated in FIG. 27, an end point of the stroke "0" and a start point of the stroke "1" are close to each other. Therefore, simply controlling time between the start point of the stroke "0" and the end point of the stroke "1" may not completely eliminate the thermal interference generated due to residual heat between the end point of the stroke "0" and the start point of the stroke "1".

SUMMARY OF THE INVENTION

Accordingly, embodiments of the present invention may provide a novel and useful control device, a laser projection device including the control device, a recording method, a computer program product for executing the recording method, and a storage medium containing the computer program solving one or more of the problems discussed above. More specifically, the embodiments of the present invention may provide a control device that is capable of reducing, when plotting a plurality of strokes on a thermal rewritable medium, residual heat interference between the strokes, a laser projection device having the control device, a recording method for reducing, when plotting a plurality of strokes on a thermal rewritable medium, residual heat interference between the strokes, a program product for executing the recording method, and a storage medium containing the computer program.

An embodiment of the invention may provide a control device for controlling a visible information forming device that forms visible information on a medium by varying positions of energy transmission. The control device includes a shape information storage configured to store a set of shape information on desired visible information to be plotted, a stroke generation unit configured to retrieve the set of shape information on the visible information to be plotted from the shape information storage to generate a first stroke data set and a second stroke data set each having at least transmission start coordinates and transmission end coordinates of a corresponding one of the first stroke and second stroke based on the retrieved set of shape information on the visible information to be plotted, a scanning start time computation unit configured to determine scanning start time of the second stroke by adjusting, when one of first points forming the first stroke made visible by energy scanning based on the generated first stroke data set and one of second points forming the second stroke made visible, subsequent to the energy scanning of the first stroke, by energy scanning based on the generated second stroke data set are selected to have a closest distance therebetween, at least one of a first waiting time to start scanning the second stroke, a traveling rate from the transmission end coordinates of the first stroke to the transmission start coordinates of the second stroke, and respective scanning rates of the first and the second strokes so as to have a desired time interval between scanning the selected one of first points of the first stroke and scanning the selected one of second points of the second stroke, a plotting instruction generation unit configured to generate a first set of plotting instructions including the at least transmission start coordinates and transmission end coordinates of the first stroke, and a second set of plotting instructions including the scanning start time of the second stroke and the at least transmission start coordinates and transmission end coordinates of the second stroke, a plotting instruction storage configured to store the generated first set of plotting instructions including the at least transmission start coordinates and transmission end coordinates of the first stroke, and the generated second set of plotting instructions including the scanning start time of the second stroke and the at least transmission start coordinates and transmission end coordinates of the second stroke, and a plotting instruction execution unit configured to execute the stored first set of plotting instructions including the at least transmission start coordinates and transmission end coordinates of the first stroke, and the stored second set of plotting instructions including the scanning start time of the second stroke and the at least transmission start coordinates and transmission end coordinates of the second stroke to plot the visible information on the medium.

Additional objects and advantages of the embodiments will be set forth in part in the description which follows, and in part will be obvious from the description, or may be learned by practice of the invention. It is to be understood that both the foregoing general description and the following detailed description are exemplary and explanatory only and are not restrictive of the invention as claimed.

BRIEF DESCRIPTION OF DRAWINGS

FIG. 4 is a diagram illustrating an example of plotting instructions;

FIGS. 17A and 17B are diagrams each illustrating a set of plotting instructions for a number "1";

BEST MODE FOR CARRYING OUT THE INVENTION

Preferred embodiments of the invention are described below with reference to the accompanying drawings.

In the following embodiments, there are two methods A and B for preventing an adverse effect of residual heat interference on a thermal rewritable medium (hereinafter, simply called "rewritable medium") 20 when characters, symbols, numbers or graphics are plotted by scanning a plurality of strokes of laser beams.

Method A: When a laser projection device 200 scans first and second strokes of laser beams at a controlled scanning rate, the laser projection device 200 computes time in which no effect of residual heat interference is generated between the first and the second strokes based on scanning start time of the first stroke and scanning start time of the second stroke (hereinafter also called "waiting time wa"), and waits the computed waiting time wa before starting to scan the second stroke.

Method B: When a laser projection device 200 scans first and second strokes of laser beams at a controlled scanning rate, the laser projection device 200 computes time in which no effect of residual heat interference is generated between the first and the second strokes based on scanning end time of the first stroke and the scanning start time of the second stroke (hereinafter also called "waiting time wb"), and waits the computed waiting time wb before starting to scan the second stroke.

The method A has more parameters than the method B; however, the waiting time wa can be reduced drastically in comparison with the waiting time wb. Thus, time required for scanning a graphic with the method A may be shorter than with the method B. The method A is particularly effective in reduction of plotting time when two parallel lines are scanned in the same directions. The method B having fewer parameters, however, is universally employed. The method B is used, for example, when two proximate lines that are not parallel are to be scanned, or when two parallel lines are to be scanned in mutually inverted directions. However, time required for scanning an image may not be minimized.

These methods are described in more details below. Note that in the following embodiments, a "stroke" indicates a straight line or a curve scanned (from a start point to an end point) by a laser beam, an "image" indicates a character, symbol, number, or graphic formed with strokes, and "plotting an image" indicates formation of an image. The "stroke" not only indicates a solid line but also includes a broken line and a dotted line.

First Embodiment

Figure 1:
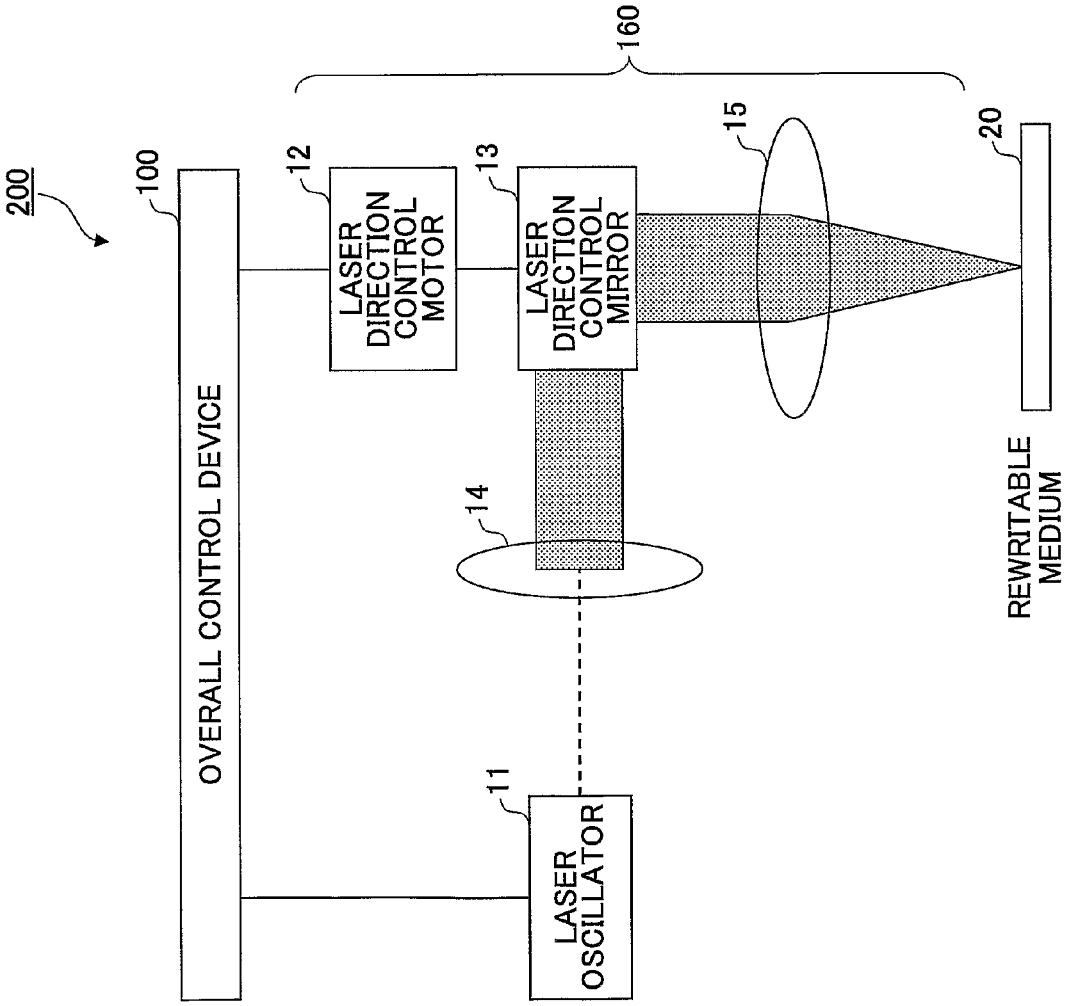
FIG. 1 is a diagram illustrating an example of a hardware configuration of a laser projection device according to an embodiment of the invention.

In this embodiment, the laser projection device 200 scanning a stroke by the method A is described. First, a hardware configuration of the laser projection device 200 is described. FIG. 1 illustrates an example of a hardware configuration of the laser projection device 200 according to the embodiment. Note that the hardware configuration of the laser projection device 200 is the same in all the following embodiments.

The laser projection device 200 includes an overall control device 100 that controls overall operations of the laser projection device 200, and a laser projection section 160 that projects a laser beam. The laser projection section 160 also includes a laser oscillator 11 that generates a laser beam, a laser direction control mirror 13 that controls a direction of the generated laser beam, a laser direction control motor 12 that controls the laser direction control mirror 13, an optical lens 14, and a converging lens 15.

The laser oscillator 11 in this embodiment is a semiconductor laser (LD: Laser Diode) oscillator, however, may be a gas laser oscillator, a solid-state laser oscillator, a liquid laser oscillator, and the like. The laser direction control motor 12 may be a servomotor that controls a reflection surface of the laser direction control mirror 13 in two axial directions. The laser direction control motor 12 and the laser direction control mirror 13 form a galvanometer mirror. The optical lens 14 adjusts the diameter of a spot projected by a laser beam, and the converging lens 15 adjusts a focal point distance by converging a laser beam.

The rewritable medium 20 is a thermal recording medium that can generate colors by heating at 180° C. or more and then immediately cooling down, and can erase colors by heating in a range of about 130 to 170° C. Typical thermal recording paper or rewritable media do not absorb laser light in a near-infrared wavelength region. Accordingly, if the laser projection device 200 employs a laser light source that oscillates laser light (semiconductor laser or solid-state laser such as YAG) in a near-infrared wavelength region, a material or a layer that absorbs laser light may need to be added to the thermal recording paper (thermal paper) or the rewritable medium 20.

In the rewritable medium 20, illegible characters generated due to excessive heat in intersecting regions, overlapped regions, and turn-around regions of the strokes may be prevented by controlling reciprocation of laser strokes. Quality of characters on the rewritable medium 20 may be maintained by forming a gap between the strokes. Specifically, in the rewritable medium 20, generation of the excessive heat in intersecting regions, overlapped regions, and turn-around regions of the strokes can be controlled by preventing reciprocation of laser strokes. Accordingly, remaining characters or images (i.e., inerasable characters and images) or degradation of display colors on the rewritable medium due to the degradation of the rewritable medium may be prevented. "Rewritable" herein indicates capability of recording characters or images by heating the medium with a laser beam and of erasing the recorded characters and images by heating with a laser beam, hot-air, and hot-tamping.

In the embodiments, the rewritable medium 20 is used as an example of media; however, unrewritable media such as thermal paper, plastic media, and metallic media may suitably be used. Note that unrewritable thermal paper indicates thermal recording paper in which colors are not erased by heating.

A laser beam generated by the laser oscillator 11 passes through the optical lens 14 so as to enlarge a diameter of a spot formed by the laser beam. Thereafter, a traveling direction of the generated laser beam is adjusted by the galvanometer mirror according to a shape of a character, and the laser beam is then converged at a predetermined focal point distance by the converging lens 15, thereby projecting the laser beam onto the rewritable medium 20. Upon exposure to the laser beam, an exposed portion of the rewritable medium 20 generates heat to form colors, thereby plotting a character or an image on the rewritable medium 20. Note that erasability of the rewritable medium 20 in this process may be suppressed.

The laser projection position is adjusted such that the overall control device 100 drives the laser direction control motor 12 to move the laser direction control mirror 13. The overall control device 100 also controls the laser oscillator 11 to turn the laser beam on or off, or to adjust intensity of the laser beam. Widths of the strokes may be varied by controlling intensity of laser projection, positions or focal point distances of the optical lens 14 and the converging lens 15, and a position of the rewritable medium 20.

The overall control device 100 records scanning start time and scanning end time on RAM 32 for the strokes. Accordingly, the scanning start time and the scanning end time for the corresponding the scanned strokes can be retrieved. Note that "time" herein may be the absolute time, or may be relative time determined based on the start time of scanning the first stroke.

Figure 2:
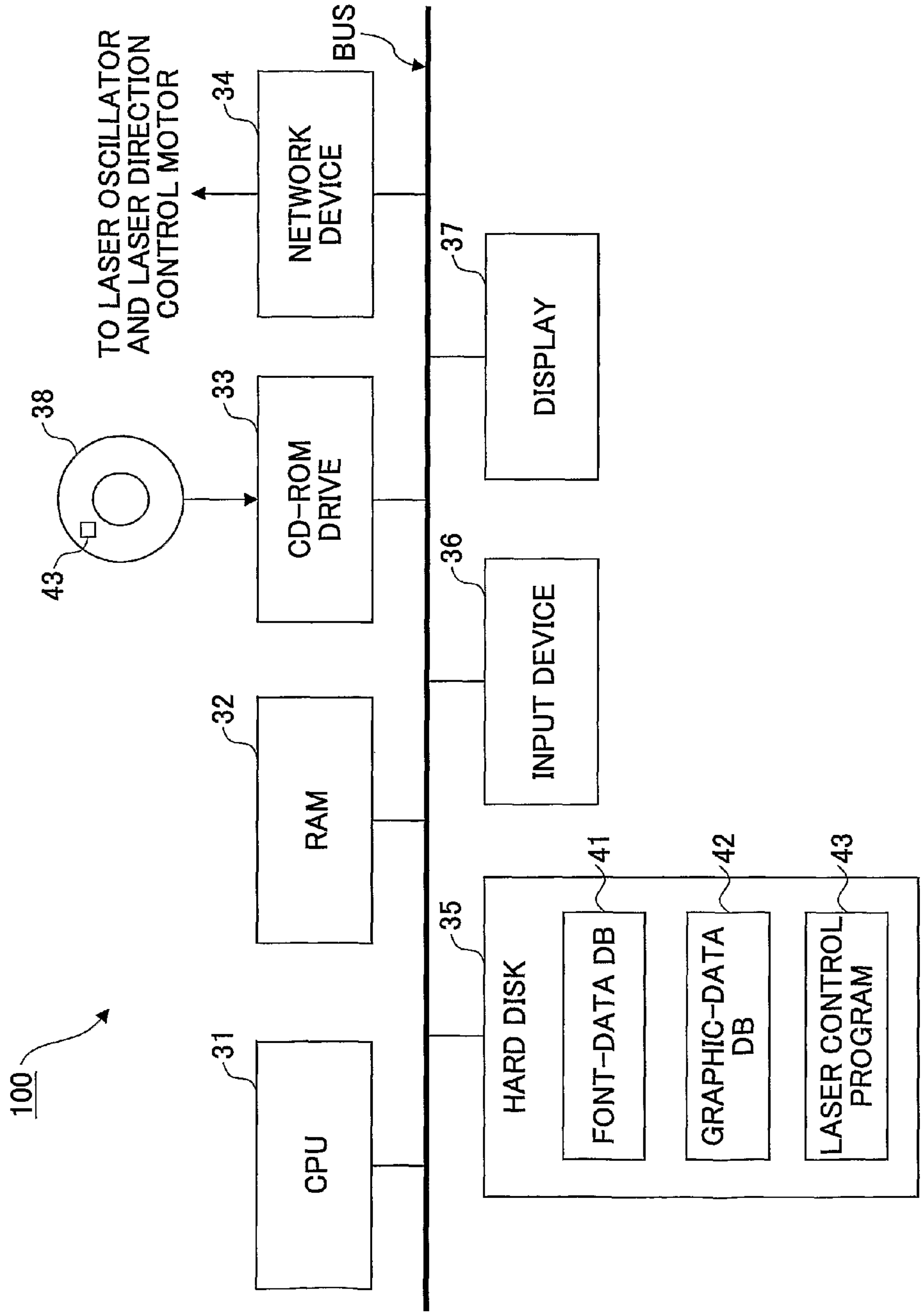
FIG. 2 is a diagram illustrating an example of a hardware configuration of an overall control device according to the embodiment of the invention.

FIG. 2 illustrates an example of a hardware configuration of the overall control device 100. Specifically, FIG. 2 illustrates the hardware configuration in a case where the overall control device 100 is mainly implemented by software. Accordingly, a computer in this configuration is a physical component. In a case where a computer is not a physical component, the overall control device 100 is implemented by ICs for specific functions such as an ASIC (Application Specific Integrated Circuit).

The overall control device 100 includes a CPU 31, a RAM 32, a hard disk 35, an input device 36, a CD-ROM drive 33, a display 37, and a network device 34. The hard disk 35 includes a font-data DB 41 that stores font data such as characters and symbols, a graphic-data DB 42 that stores graphic data such as shapes, and a laser control program 43 that controls the laser projection section 160 by generating plot instructions based on the font data or the graphic data.

The CPU 31 retrieves the laser control program 43 from the hard disk 35 to execute the retrieved laser control program 43, thereby plotting characters, symbols, numbers, or graphics on the rewritable medium based on the later described procedure. Note that the RAM 32 is a volatile memory such as a DRAM, and utilized as a work area while the laser control program 43 is being executed by the CPU 31. The input device 36 may be a mouse or a keyboard that is used by a user to input instructions for controlling the laser projection section 16. The display 37 is utilized as a user interface and displays a GUI (Graphical User Interface) with a predetermined number of colors at a predetermined resolution based on screen information instructed by the laser control program 43. An example of the GUI may be an entry field for the user to input a character that the user desires to plot on the rewritable medium 20.

The CD-ROM drive 33 is configured such that a CD-ROM 38 inserted therein can be removable. The CD-ROM drive 33 is used when data needs to be retrieved from the CD-ROM 38, or when data needs to be recorded on a recordable medium. The CD-ROM 38 on which the laser control program 43, the graphic-data DB 42, and the font-data DB 41 are recorded is distributed to the user, so that they are retrieved from the CD-ROM 38 to be installed on the hard disk 35. The CD-ROM 38 may be any one of nonvolatile memories such as DVD, Blu-ray disk, SD card, memory stick (registered trademark), multimedia card, and xD card.

The network device 34 is an interface (e.g., Ethernet (registered trademark)) for connecting devices to the Internet or LAN. The network device 34 is capable of executing processing based on protocols specified in a Physical Layer and a Data Link Layer of the OSI Reference Model and transmitting the plotting instructions to the laser projection section 160 based on character encoding. The laser program 43, the graphic-data DB 42, and the font-data DB 41 can be downloaded from predetermined servers connected via the network. Alternatively, the overall control device 100 and the laser projection section 160 may have a direct physical connection via a USB (Universal Serial Bus), IEEE 1394, wireless USB, and Bluetooth without being connected via the network.

Characters, symbols, numbers, or graphics to be plotted on the rewritable medium 20 may be listed and stored in the hard disk 35, or they may be input by the input device 36. The characters, symbols, and numbers are specified by the character encoding such as a JIS coding, whereas graphics are specified by a graphic encoding. The overall control device 100 retrieves one of the font data corresponding to the character encoding from the font-data DB 41, and also retrieves one of the graphic data corresponding to the graphic encoding from the graphic-data DB 42. The overall control device 100 controls the laser projection section 160 by converting the font data or graphic data into the plotting instructions as described later.

[Functional Components]

Figure 3:
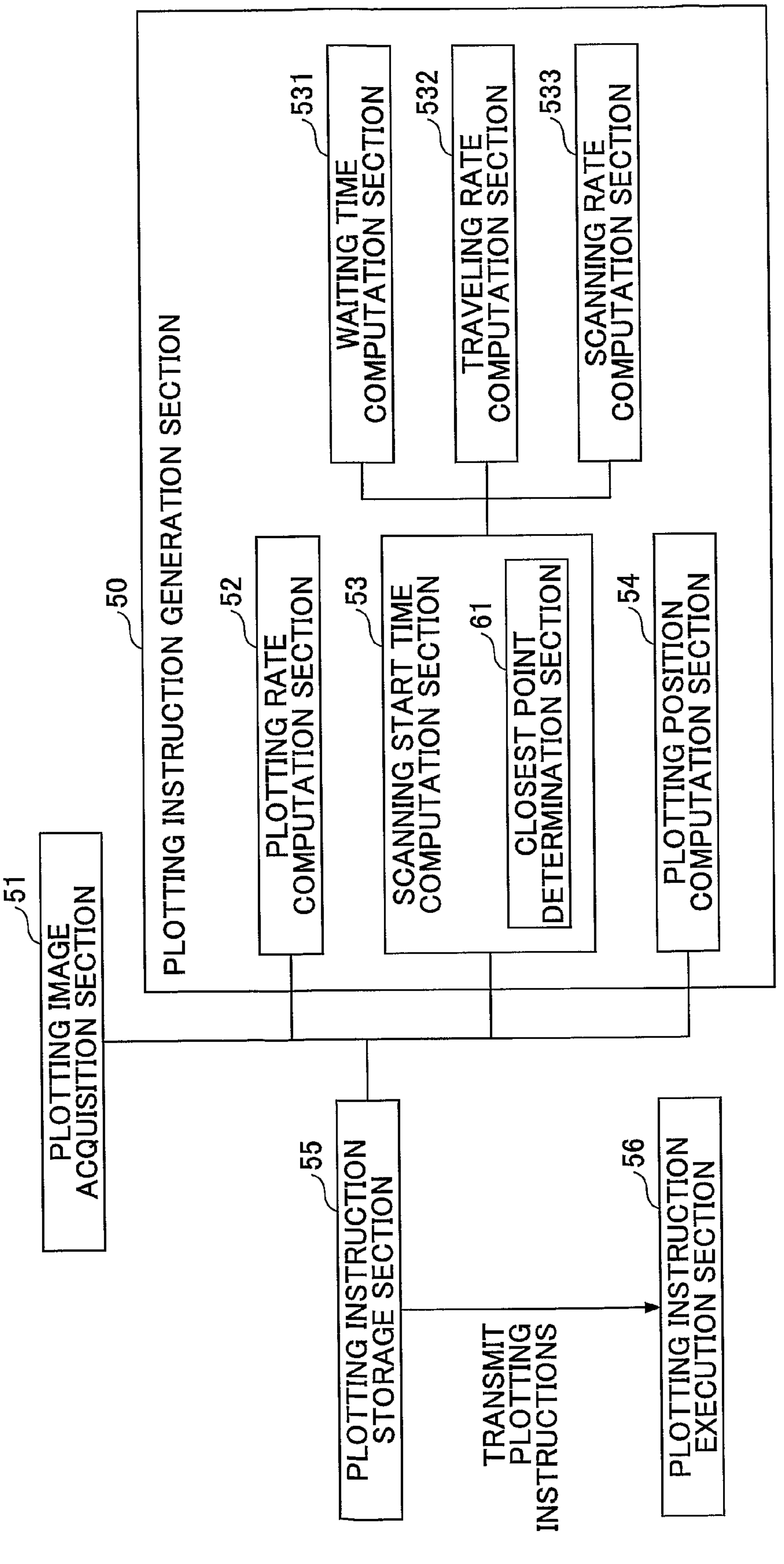
FIG. 3 is a block diagram illustrating an example of functional components of the laser projection device according to the embodiment of the invention.

FIG. 3 illustrates an example of functional components of the laser projection device 200 according to the embodiment. In a case where the functional components are realized by software, the functional components of the laser projection device 200 are realized by causing the CPU 31 to execute the laser control program 43. The laser projection device 200 includes a plotting image acquisition section 51, a plotting instruction storage section 55, a plotting instruction execution section 56, and a plotting instruction generation section 50. The functional components of the laser projection device 200 are described below.

The plotting image acquisition section 51 retrieves font-data from the font-data DB 41 and graphic data from the graphic-data DB 42. The retrieved font data or graphic data may be stored in the hard disk 35, or may be input from the input device 36.

<Plotting Instructions: Scanning Start Point and Scanning End Point>

The plotting instruction generation section 50 generates a set of plotting instructions based on a set of the font data or graphic data. FIG. 4 illustrates an example of sets of plotting instructions. The laser projection device 200 repeatedly scans strokes to plot characters, symbols, numbers, or graphics. Thus, a set of plotting instructions includes a collection of information for scanning strokes. In FIG. 4, "t", "u", "v", "m", "d", and "wa" respectively represent a "stroke width", a "traveling rate between one point and a subsequent scanning start point", a "scanning rate of one stroke", a "traveling (time) between one point and specified coordinates", a "scanning (time) between one point and specified coordinates", and a "waiting time". Note that since the first stroke does not require a "waiting time" factor, there is no "wa" instruction for the first stroke.

In the embodiments, "t", "u", "v", "m", and "d" may, as illustrated in FIG. 4, be specified for each stroke. Alternatively, "t", "u", and "v" may not be specified for each stroke but to be specified for a character, a symbol, a number, or a graphic.

Referring back to FIG. 3, the plotting instruction generation section 50 generates the sets of the plotting instructions of FIG. 4 based on the font data or graphic data. The plotting instruction generation section 50 includes a plotting rate computation section 52, a scanning start time computation section 53, and a plotting position computation section 54. The scanning start time computation section 53 includes a waiting time computation section 531, a traveling rate computation section 532, and a scanning rate computation section 533.

First, a process of computing a plotting position carried out by the plotting position computation section 54 is described; however, a process related to the font data is described in a second embodiment. The first embodiment describes a process of generating plotting instructions based on the graphic data.

Graphical data includes two major graphic types, namely, vector data and bitmap data. The vector data are temporarily converted into raster data (i.e, rasterized) and the bitmap data are converted into raster data. Terms "bitmap data" and "raster data" are often used as having the same meaning and interchangeably used; however, they are used as having separate meanings throughout the embodiments.

Figure 5A:
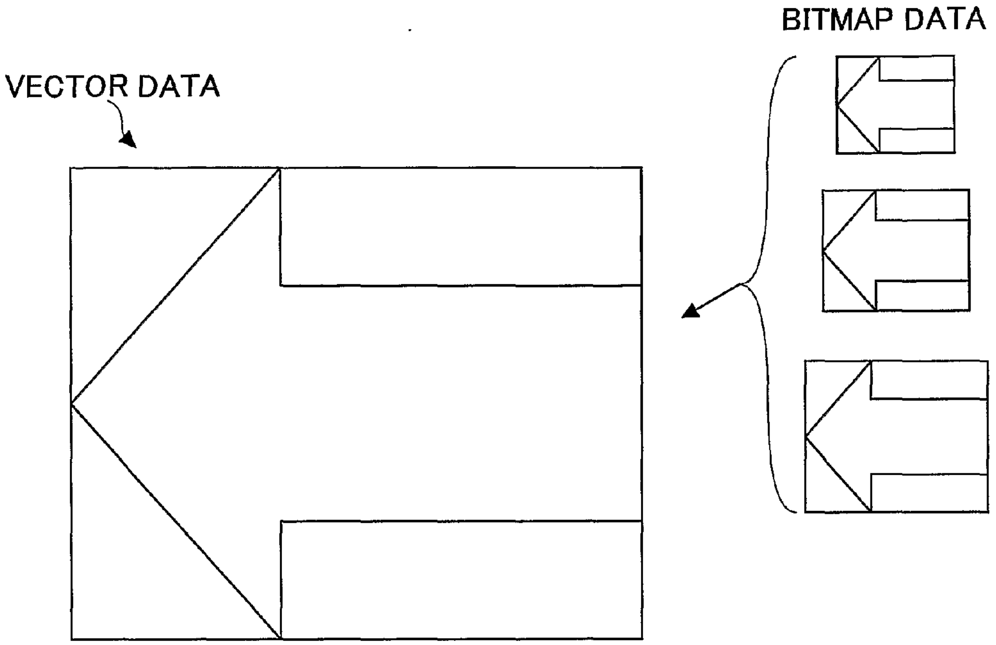
FIGS. 5A and 5B are diagrams each schematically illustrating an example of generation of plotting instructions.
Figure 5B:
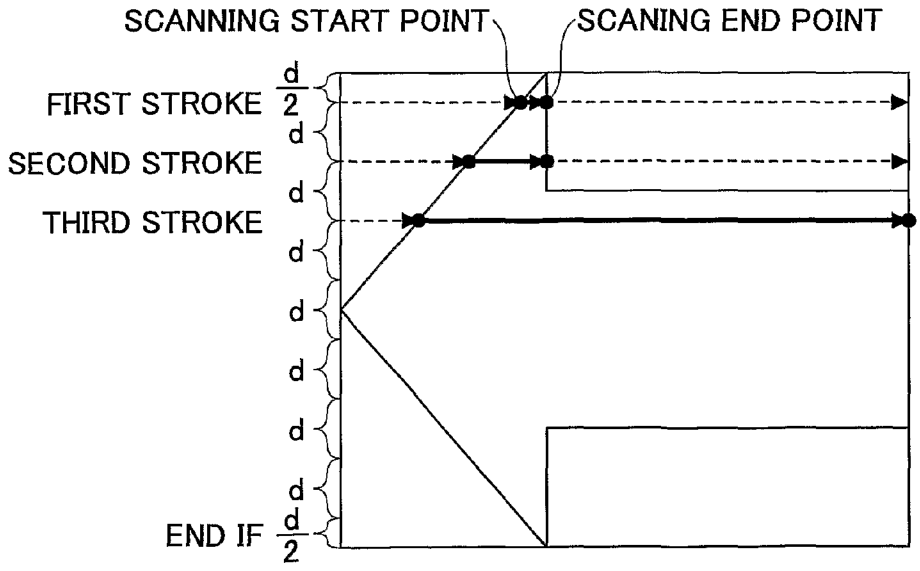

FIGS. 5A and 5B each schematically illustrate an example of a generated set of plotting instructions. When generating plotting instructions for vector data, the plotting position computation section 54 rasterizes a vector graphic to obtain a raster graphic having a font size specified by the input device 36. In generating plotting instructions for bitmap data, the plotting position computation section 54 retrieves a bitmap graphic having the specified size or the closest size to the original data from the same graphic data having different sizes registered. Accordingly, raster data illustrated in FIG. 5A may be obtained. That is, the raster data forms a left-pointing arrow as illustrated in FIG. 5A.

Thereafter, the plotting position computation section 54 retrieves sets of coordinates of an outline of the obtained raster data. The retrieved sets of the coordinates of the outline of the obtained raster data correspond to sets of coordinates of strokes to be scanned later. Hence, the sets of coordinates are retrieved for each stroke width. The coordinates also correspond to scanning directions of a laser beam, that is, retrieving directions of the coordinates are parallel to the scanning directions of laser beams. For example, if a scanning direction is left to right or right to left, the plotting position computation section 54 retrieves coordinates of a left point and a right point of the outline of the raster data.

Specifically, if a stroke width is d (herein, stroke width "d" is a measured value and different from a stroke width "t" indicating a control code in plotting instructions), the plotting position computation section 54 retrieves the coordinates of the outline of the raster data at a point d/2 distant from an top side to a bottom side (see FIG. 5B). As illustrated in FIG. 5B, when one of the left coordinates and right coordinates is a scanning start point specified by a plotting instruction "m", the other coordinates will be a scanning end point specified by a plotting instruction "d". A stroke generates heat which is transmitted both in upper and lower directions of the center-line of the stroke, thereby forming a stroke width d. The coordinates of the outline of the raster data are thus retrieved at a distance d/2 from the top side of the raster data. Hereafter, coordinates of the outline of the raster data are retrieved at a distance of the stroke width d from a preceding stroke. This process of retrieving coordinates of the outline of the raster data is repeatedly carried out until the process of the lowest stroke of the raster data is completed. Accordingly, coordinates of respective plotting instructions "m" and "d" (scanning start point and scanning end point) for each stroke may be obtained. Note that scanning of a stroke may end when a remaining distance is shorter than d/2 from the bottom side of the raster data. In this case, a fraction of the image may not be plotted at a lower side; however, the stroke width d is sufficiently thin to have little effect on plotting the image.

<Plotting Instructions: Scanning Rate and Traveling Rate>

As described earlier, the plotting instructions include the traveling rate "u" and the scanning rate "v". Plotting is completed at the fastest rate if the traveling rate "u" is set to the maximum rate. Accordingly, in this embodiment, the traveling rate "u" is fixed to a value of the maximum rate.

By contrast, the scanning rate "v" may need to have an appropriate value. The appropriate value indicates a scanning rate "v" at which the rewritable medium 20 generates an adequate color and does not generate too much heat due to physical properties of the rewritable medium 20 and a laser beam. Such a scanning rate "v" is determined based on experiments, however, the scanning rate "v" has an allowable range of vmin to vmax. Accordingly, the plotting rate computation section 52 appropriately selects one of the median, minimum and maximum values vmin to vmax as the scanning rate "v", and sets the selected value to be the plotting instruction "v". The relationship between plotting time (duration) and a scanning rate is as follows. If the scanning rate "v" is small, a scanned portion of the rewritable medium 20 generates an excellent color while plotting time gets longer, whereas the scanning rate "v" is large, a scanned portion of the rewritable medium 20 generates a poor color while plotting time gets shorter. Accordingly, the plotting rate computation section 52 selects the scanning rate "v" from the scanning rates vmin to vmax based on "prioritized quality", "prioritized rate", and so on specified by the user.

Note that there is a complementary relationship between the scanning rate "v" and the waiting time "wa". In view of waiting time for the temperature of a preceding stroke to be sufficiently cooled down (hereafter simply called "residual heat waiting time" or "residual heat decrease time"), if the scanning rate "v" is large, the waiting time "wa" gets long, whereas if the scanning rate "v" is small, the waiting time "wa" gets short. The "residual heat waiting time" indicates a period between scanning start time of a first stroke and scanning start time of the second stroke in which the temperature of the first stroke is sufficiently lowered so that residual heat interference scarcely affects scanning of the second stroke. Accordingly, even if the default of the scanning rate "v" has been set to vmin, the plotting rate computation section 52 computes and sets a certain value for the scanning rate "v" so as not to generate the waiting time. Likewise, even if the default of the scanning rate "v" has been set to vmax, the plotting rate computation section 52 computes and sets a certain value for the scanning rate "v" so as not to generate the waiting time.

A function of a scanning start time computation section 53 is described below. The scanning start time computation section 53 determines scanning start time for the second stroke by adjusting at least one of the waiting time between the scanning of the first and the second strokes, traveling time between the scanning of the first and the second strokes, and respective scanning rates of the first and the second strokes so as to obtain an appropriate interval between two proximate points of the first stroke and the second stroke. Accordingly, there are three methods in order to determine the scanning start time of the second stroke; that is, a method of adjusting waiting time between scanning of the first and the second strokes, a method of adjusting traveling rate between scanning of the first and the second strokes, or a method of adjusting respective scanning rates of the first and the second strokes.

<Adjustment of Waiting Time wa>

Figure 6A:
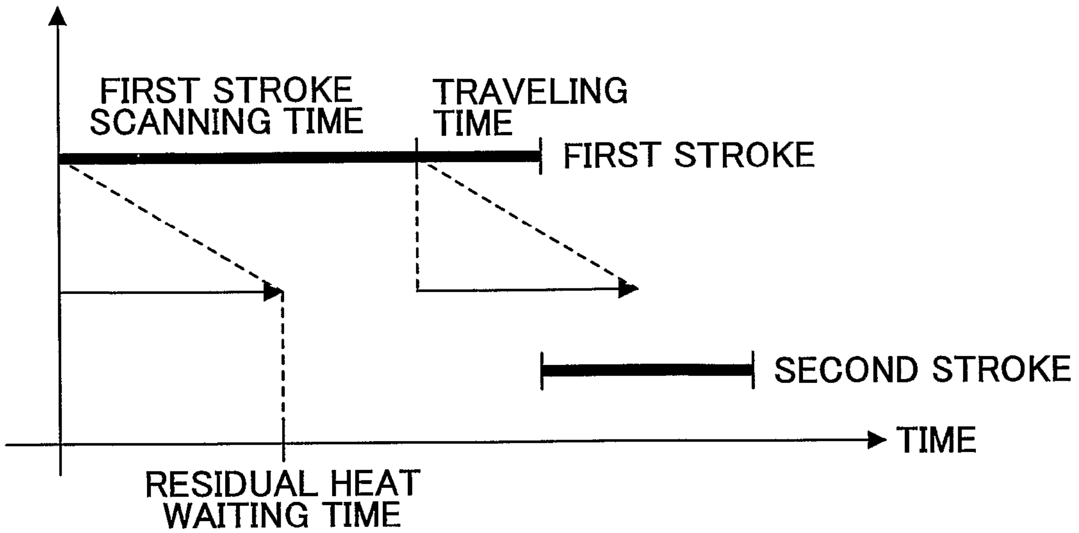
FIGS. 6A and 6B are diagrams each illustrating an example of residual heat waiting time.

Next, the waiting time wa is described. In a case where the scanning rate "v" for each stroke is a fixed value, the residual heat interference may be prevented by adjusting the waiting time wa. FIG. 6A illustrates an example of residual heat waiting time. A waiting time computation section 531 starts measuring the residual heat time from a portion already exposed to a laser beam while the first stroke is being scanned. The first stroke is gradually cooled down from a portion closer to the scanning start point. An adjacent stroke can be scanned after the residual heat waiting time has elapsed from the scanning start time of the first stroke. The residual heat waiting time is measured from the scanning end point of the first stroke. Thus, an adjacent second stroke can be scanned after the residual heat waiting time has been elapsed from the scanning end point of the first stroke. Note that the residual heat waiting time is constant in the rewritable medium 20 regardless of the scanning rates "v".

In practice, there is traveling time after scanning of the scanning end point of the first stroke and the scanning start point of the second stroke, that is, until the subsequent second stroke is scanned at the coordinates of the scanning start point of the second stroke. Accordingly, if a total of the scanning time of the first stroke and traveling time between scanning of the first and the second strokes exceeds, the residual heat waiting time, the waiting time wa is set to zero to thereby immediately start scanning of the second stroke.

Figure 6B:
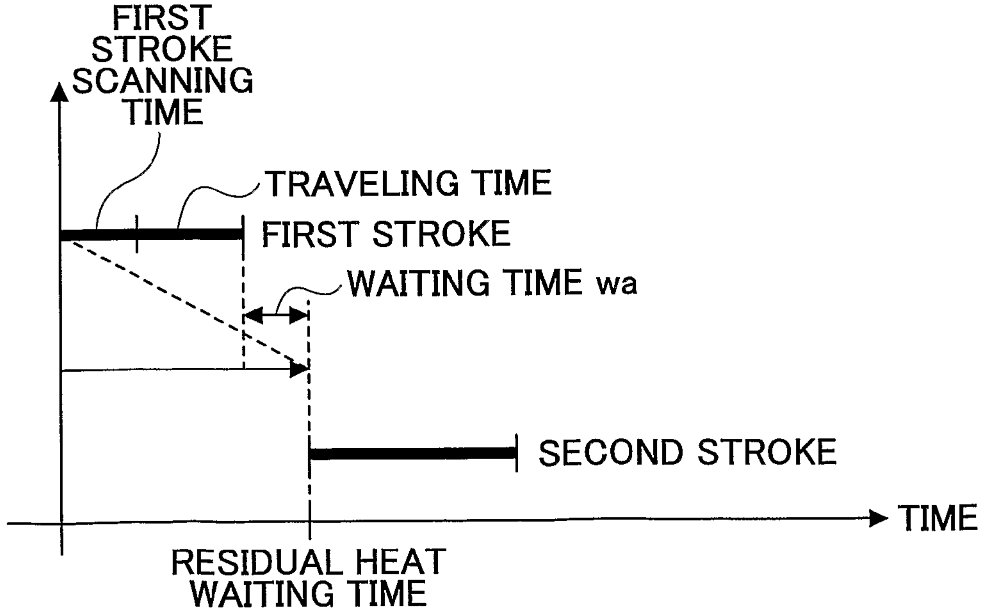

In contrast, as illustrated in FIG. 6B, if a total of the scanning time of the first stroke and traveling time between the scanning of the first and the second strokes is shorter than the residual heat waiting time, the waiting time wa needs to be set. In this case, the waiting time wa is obtained by the following formula:

(Residual heat waiting time)−(first stroke scanning time+first stroke traveling time)

The waiting time computation section 531 computes the waiting time wa for each of the first to last strokes with this procedure.

Note that the aforementioned procedure is appropriate in a case where the scanning rate "v" of the second stroke is equal to or lower than that of the first stroke. In a case where the scanning rate "v" of the second stroke is higher than that of the first stroke, a different procedure is used, which will be described later.

Figure 7A:
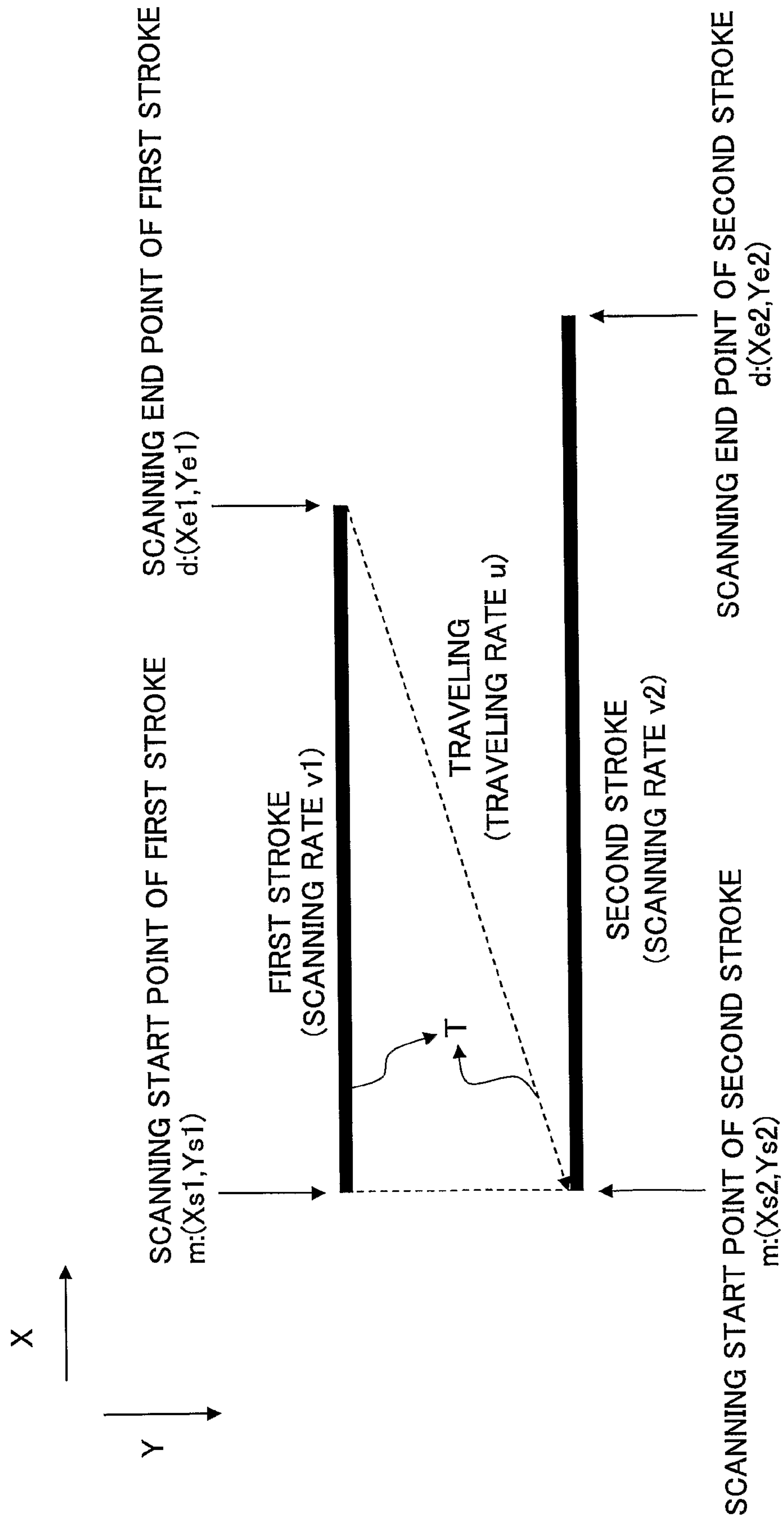
FIGS. 7A to 7C are diagrams each illustrating an example of time T in which a laser projection position is moved from coordinates of a start point of scanning a stroke 1 to coordinates of a start point of scanning a stroke 2.

The specific procedure for computing the waiting time wa is described below by referring to FIG. 7A. In FIG. 7A, the scanning rate of the first stroke is "v1", the traveling rate between the first and the second strokes is "u", the coordinates of the scanning start point of the first stroke are (Xs1, Ys1), the coordinates of the scanning end point of the first stroke are (Xe1, Ye1), and the coordinates of the scanning start point of the second stroke are (Xs2, Ys2). Time T is time in which a laser beam projection position is moved from the scanning start point of the first stroke to the scanning start point of the second stroke. Time T is expressed by the following equation (1).

$$T=\sqrt{(Xe1-Xs1)^2+(Ye1-Ys1)^2}/v1+\sqrt{(Xs2-Xe1)^2+(Ys2-Ye1)^2}/u \quad (1)$$

Accordingly, if time T<the residual heat waiting time, the waiting time wa is required. The scanning start time computation section 53 computes the waiting time wa based on the following equation. If time T<the residual heat waiting time, the scanning start time computation section 53 sets the waiting time wa obtained by the following equation:

Waiting time "*wa*"=residual heat waiting time−time *T*

Figure 7B:
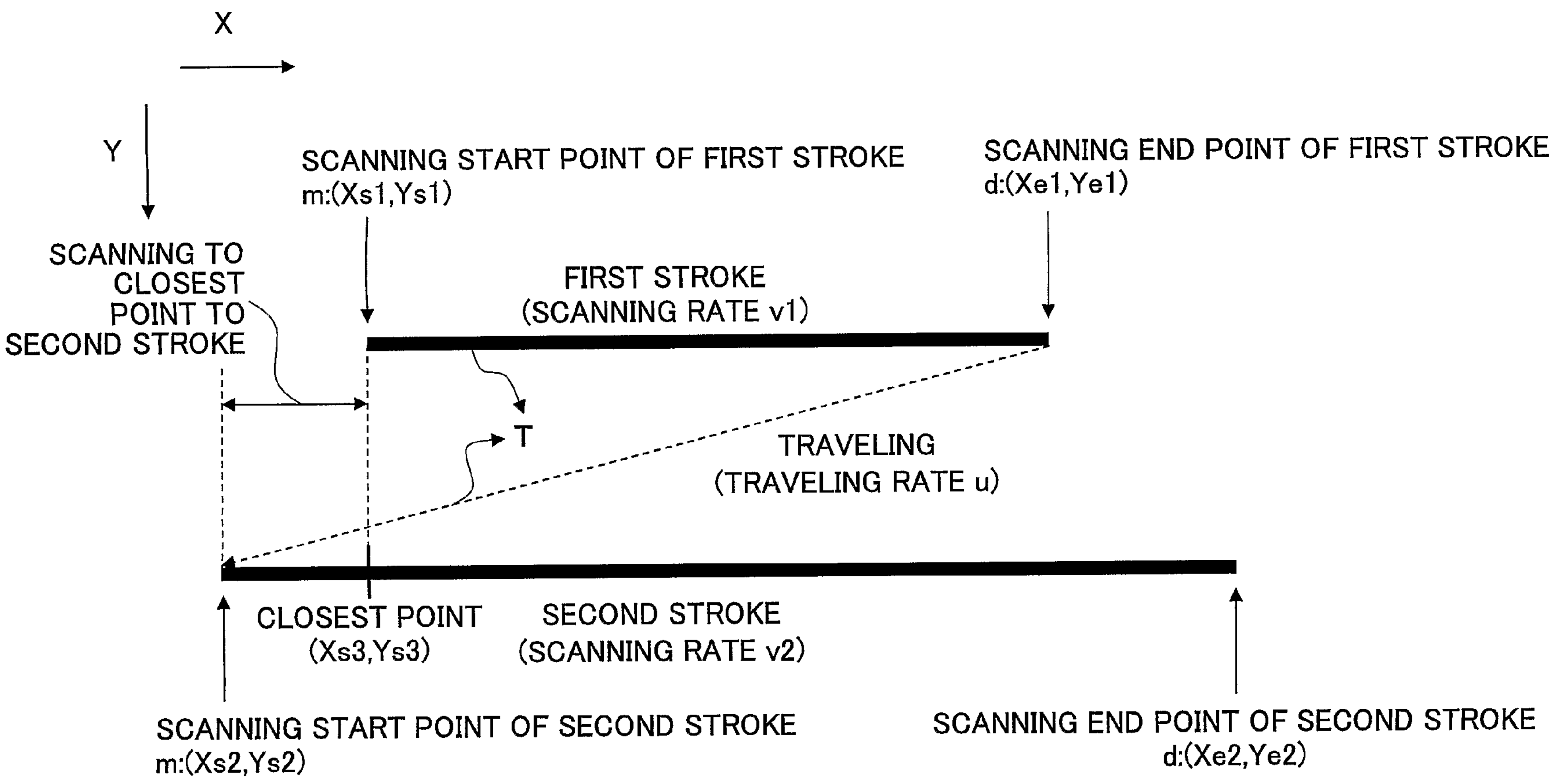
Figure 7C:
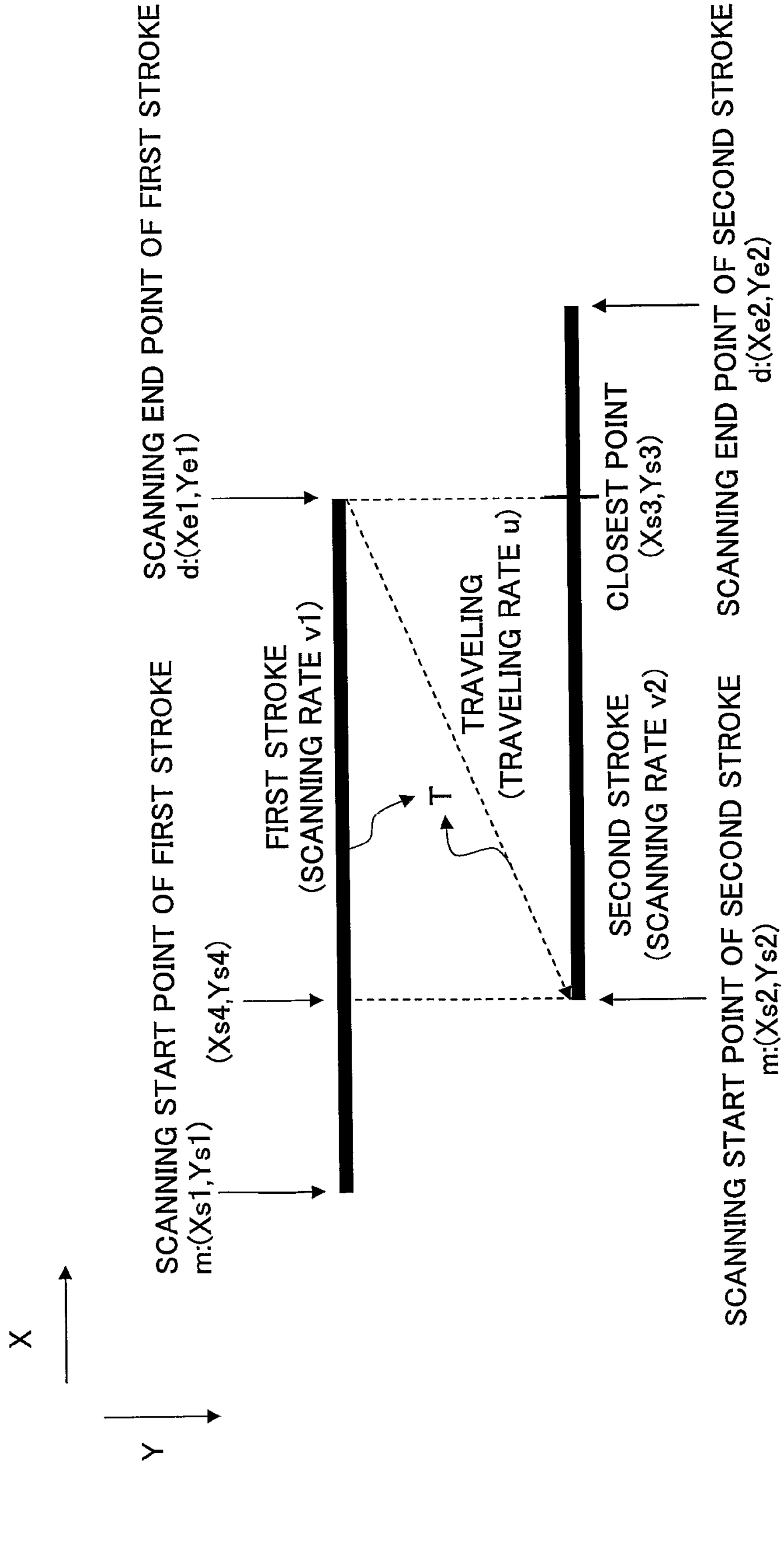

Note that in FIG. 7A, the scanning starting points of the first and the second strokes in x-axis directions are the same; however, if they are different, another factor called a "closest point" illustrated later may need to be taken into account in computing waiting time wa. In FIG. 7B, the scanning start point of the second stroke is located on a left side of the scanning start point of the first stroke in the x-axis directions. In FIG. 7C, the scanning start point of the second stroke is located on a right side of the scanning start point of the first stroke in the x-axis directions. Accordingly, time required for moving a scanning position of the laser beam to a point closest to the second stroke from the first stroke (first closest point) or time required for moving a scanning position of the laser beam to a point closest to the first stroke from the second stroke (second closest point) may need to be compared with the residual heating waiting time.

For this comparison, the closest point determination section 61 determines a first closest point closest to the second stroke from the first stroke and a second closest point closest to the first stroke from the second stroke, for example. The closest point determination section 61 obtains the closest points by the following procedures. First, intersections are obtained by drawing vertical lines from both ends of the first stroke to the second stroke (or may not have an intersection), or obtained by drawing vertical lines from both ends of the second stroke to the first stroke (may not have an intersection). With this procedure, a maximum of four intersections may be obtained. Next, a maximum of four distances between the four intersections are obtained, and then, one of the shortest distance of the obtained four distances is determined as a closest point. Thereafter, the scanning start time computation section 53 computes the time T based on the obtained closest point.

Note that since the first and the second strokes are parallel with each other, there exists an infinite number of combinations of closest points on the first and the second strokes. If the scanning rate "v" of the second stroke is equal to or lower than that of the first stroke, the shortest time interval is obtained based on the combination of the closest points one of which includes the scanning start point of the first stroke. If v1=v2, the same time interval is obtained based on any one of the combinations of the obtained closest points.

As illustrated in FIG. 7B, if v1=v2, the combination of the closest points is (Xs1, Ys1) and (Xs3, Ys3). In this case, time T to move the laser projection position between the closest points may be expressed by the following equation (2).

$$T=\sqrt{(Xe1-Xs1)^2+(Ye1-Ys1)^2}\Big/v1+\sqrt{(Xs2-Xe1)^2+(Ys2-Ye1)^2}\Big/u+\sqrt{(Xs3-Xs2)^2+(Ys3-Ys2)^2}\Big/v2 \quad (2)$$

Accordingly, as illustrated in FIG. 7B, if the scanning start point of the second stroke is located on the left side of that of the first stroke in the x-axis directions, the scanning start time computation section 53 computes the time T based on the above equation (2) to compare the obtained time T with the residual heat waiting time.

FIG. 7C illustrates a case where the scanning start point of the second stroke is located on the right side of that of the first stroke in x-axis directions. In this case, if v1=v2, the shortest time interval among the combinations of the closest points is the combination of (Xs4, Ys4) and (Xs2, Ys2). Note that the shortest time interval may be the same between one of points (Xs2, Ys2) to (Xs3, Ys3) and any one of the points distant from the points (Xs2, Ys2) to (Xs3, Ys3) in a vertical direction. The scanning start time computation section 53 computes time in which a laser beam passes between these two points, that is, time T in which the closest point (Xs4, Ys4) of the first stroke is scanned and the laser beam projection position is moved to the scanning start point (Xs2, Ys2) of the second stroke. The scanning start time computation section 53 then compares the obtained time T with the residual heat waiting time.

The obtained time T is expressed by the following equation (3).

$$T=\sqrt{(Xs4-Xe1)^2+(Ys4-Ye1)^2}/v1+\sqrt{(Xs2-Xe1)^2+(Ys2Ye1)^2}/u \quad (3)$$

Below, a case where the scanning rate "v2" of the second stroke is higher than the scanning rate "v1" of the first stroke is described. As illustrated in FIG. 7C, if the scanning rate "v2" of the second stroke is higher than the scanning rate "v1" of the first stroke, the shortest time interval is obtained based on the combination of the closest points one of which includes the scanning end point of the first stroke, that is, (Xe1, Ye1) and (Xs3, Ys3). Accordingly, time Tb between scanning the point (Xe1, Ye1) of the first stroke and scanning the point (Xs3, Ys3) of the second stroke may need to be longer than the residual heat waiting time. Time T, in which a laser beam projection position is moved from the closest point (Xe1, Ye1) of the first stroke to the closest point (Xs3, Ys3) of the second stroke, is expressed by the following equation 4.

$$T_b=\sqrt{(Xs2-Xe1)^2+(Ys2-Ye1)^2}/u+\sqrt{(Xs2-Xs3)^2+(Ys2Ys3)^2}/v2 \quad (4)$$

In equation (4), waiting time wa=residual heat waiting time−time Tb

Accordingly, the waiting time wa is selectively set based on the obtained relationship between the time T and the residual heat waiting time if a graphic having the same shape but having a different size is solidly shaded. For example, there are two arrows having different sizes to be plotted. If the size of the arrow is large and a length of the first stroke is thus sufficiently long, the residual heat waiting time may elapse before the laser projection position is moved to the scanning start point of the second stroke. In this case, the waiting time wa is not required. In contrast, if the size of the arrow is small and a length of the first stroke is thus short, the residual heat waiting time may not elapse until the laser projection position is moved to the scanning start point of the second stroke. In this case, the waiting time wa can be set for the laser projection device 200 according to the embodiment. That is, even if the plotting instructions are generated based on the graphic of the same shape, the waiting time wa may be set for the laser projection device 200 only in a case where a graphic stored in the graphic-data DB is plotted in a smaller size.

<Adjustment of Traveling Rate "u">

Instead of setting of the waiting time wa, a lower traveling rate (u−Δu, wherein Δu>0) may alternatively be set for the laser projection device 200. In this case, the traveling rate is adjusted based on the following equation. In the equation below, if a distance between the scanning end point of the first stroke and the scanning star point of the second stroke is Lu (i.e., traveling distance) and the traveling rate of the traveling distance is u−Δu (Δu>0), the traveling rate between scanning of the first and the second strokes may be adjusted as expressed by the following equation.

$$\Delta u=lu/wa$$

The traveling rate computation section 532 computes Δu instead of the waiting time wa based on an instructions such as those received from a user.

<Adjustment of Scanning Rate "v">

In the laser projection device 200 according to the embodiment, the scanning rate "v" of the strokes is set to be a fixed value vmax, so that the residual heat interference may be prevented by adjusting the waiting time wa. However, as illustrated earlier, the scanning rate "v" of each stroke may also be adjusted, and such a case is described below. The scanning rate computation section 533 adjusts the scanning rate "v".

Figure 8A:
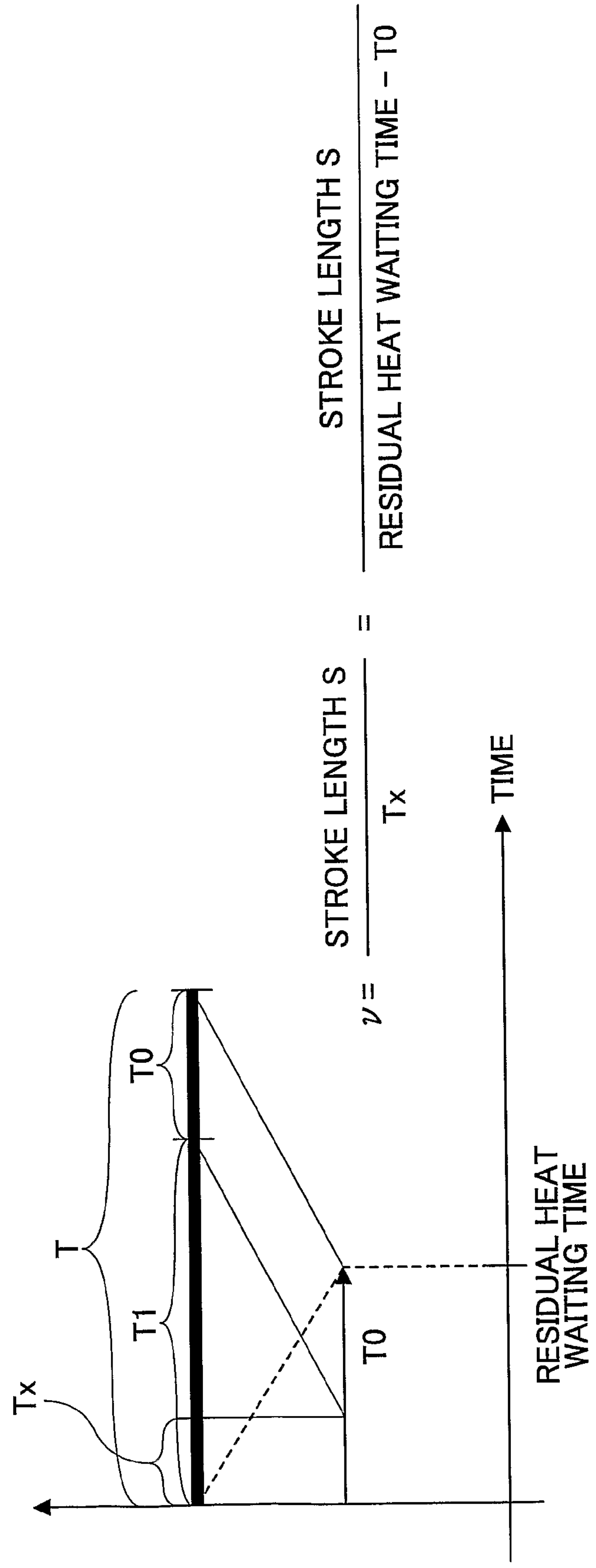
FIGS. 8A and 8B are diagrams illustrating an example of a relationship between time T and the residual heat waiting time.

FIG. 8A illustrates time T in which a laser beam projection position is moved from the scanning start point of the first stroke to the scanning start point of the second stroke, and the residual heat waiting time that is shorter than the time T. In this case, there is a significantly long waiting time wa, so the scanning rate "v" of the first stroke may be increased, thereby decreasing the scanning time of the first stroke. Such adjustment is effective in a case where reduction of plotting time is focused on rather than quality of plotted graphics.

In this case, the scanning time may be reduced until the time T obtains a value equal to the residual heat waiting time. Note that traveling time T0 is a fixed value for the first and the second strokes, and thus, only the scanning time T1 can be reduced. If Tx represents scanning time obtained after adjusting the time T (or adjusted time T), the scanning rate "v" after adjusting the time T is obtained by dividing the length S of the first stroke by the adjusted scanning time Tx. Tx=(residual heat waiting time−T0), and v=stroke length S/(residual heat waiting time−T0). In practice, since the scanning rate "v" has an upper limit vmax, the scanning rate computation section 533 adjusts the scanning rate "v" to be equal to or below the vmax.

Figure 8B:
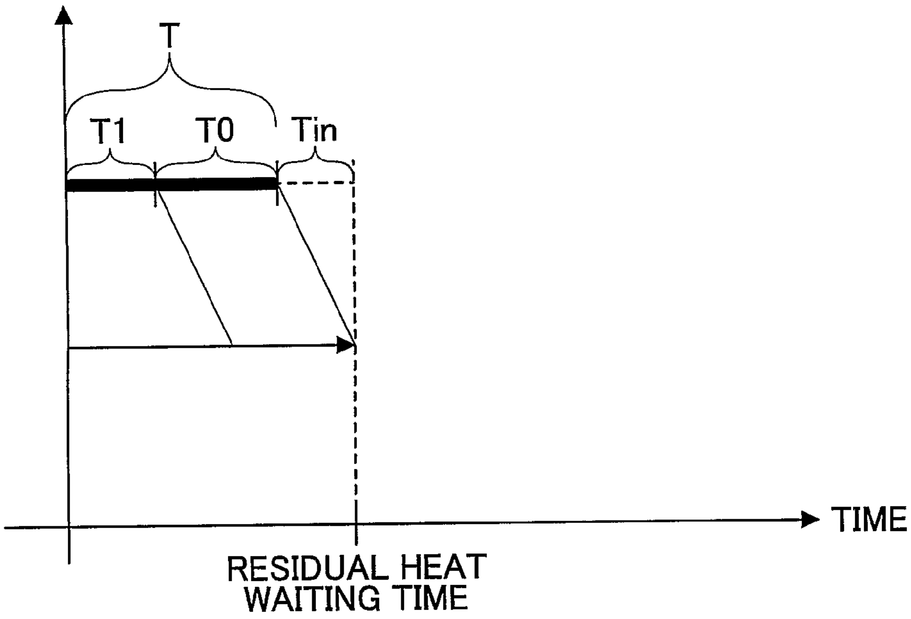

FIG. 8B illustrates time T in which a laser beam projection position is moved from the scanning start point of the first stroke to the scanning start point of the second stroke, and the residual heat waiting time that is longer than the time T. In this case, the scanning rate "v" of the first stroke may be lowered to increase the scanning time of the first stroke. As a result, time T is increased so as to obtain waiting time wa. In this case, since traveling time T0 is a fixed value, the scanning rate "v" after adjusting the scanning time of the first stroke is obtained when the stroke length S is scanned in the scanning time T1 and Tin as illustrated in FIG. 8B. Since a total amount of the time T1 and Tin equals (residual heat waiting time−T0), the scanning rate v=(first stroke length S/(residual heat waiting time−T0)). In practice, since the scanning rate "v" has an upper limit vmax, the scanning rate computation section 533 adjusts the scanning rate "v" to be equal to or below the vmax. Such adjustment is effective in a case where quality of plotted graphics is focused rather than reduction of plotting time.

Thus, the appropriate scanning rate v is thus restricted by the residual heat waiting time in both cases where there is the waiting time wa and there is no waiting time wa.

Note that in a case where the scanning rate v is adjusted, an amount of heat applied to the rewritable medium 20 is changed. For example, if the scanning rate v is increased, projection time of a laser beam is reduced. That is, a certain point on the rewritable medium 20 is exposed to the laser beam only for a short time due to an increased speed of laser projection. In this case, a portion of the rewritable medium 20 exposed to the laser beam may not sufficiently generate a color due to a decreased amount of the laser beam energy projected per unit area. Accordingly, if the scanning rate v is increased, intensity of the laser beam applied may need to be increased. In this manner, the laser beam energy projected per unit area may maintain a constant intensity, and hence the portion of the rewritable medium 20 exposed to the laser beam may sufficiently generate a color. In contrast, if the scanning rate v is decreased and the laser beam has a constant intensity, an amount of the laser beam energy projected per unit area is increased. Accordingly, the laser beam projected per unit area may maintain a constant intensity by decreasing a projected energy amount of laser beam, thereby preventing the application of an excessive amount of heat to the portion of the rewritable medium 20 exposed to the laser beam.

[Storing of Plotting Instructions]

The plotting instruction storage section 55 stores plotting instructions in the hard disk 35. When the overall control device 100 plots a graphic on the rewritable medium 20, the plotting instruction storage section 55 retrieves the plotting instructions from the hard disk 35 to be transmitted to the plotting instruction execution section 56. When obtaining the plotting instructions, the plotting instruction execution section 56 adjusts output power of the laser oscillator 11 and the converging lens 15 based on information on the width of the stroke of the plotting instructions, and then projects a laser beam from scanning start point to scanning end point of the stroke. Accordingly, the rewritable medium 20 generates heat to display, a color, and as a result, a graphic or symbol can be plotted on the rewritable medium 20.

Figure 9A:
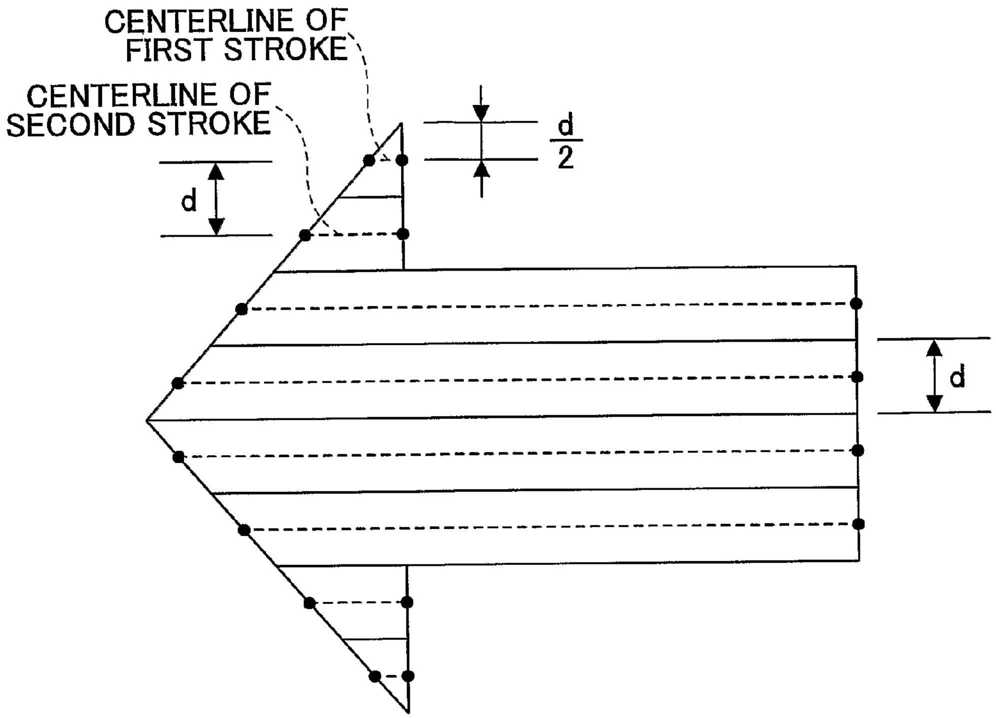
FIGS. 9A and 9B are diagrams each schematically illustrating an example of laser scanning trajectories.
Figure 9B:
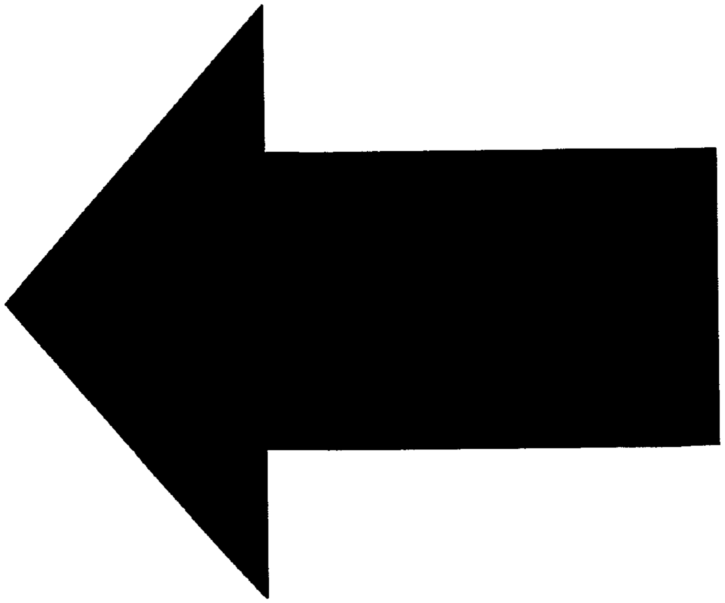

FIG. 9A schematically illustrates an example of laser scanning trajectory, and FIG. 9B illustrates an example of an image plotted by scanning the strokes illustrated in FIG. 9A. In FIG. 9A, a dotted line represents the trajectory and a solid line represents a boundary between colors generated by scanning. Two ends of each trajectory determine an outline of raster data that is retrieved when the plotting instructions are generated.

Accordingly, if a stroke width of the laser beam is d, a first stroke is scanned at a position d/2 distant from an upper point of a graphic of an arrow, and subsequently, a second stroke is scanned at a position d distant from the first stroke. Thereafter, subsequent strokes are scanned at a position d distant from the corresponding preceding strokes so as to scan all the strokes of the arrow from top to bottom. Alternatively, the strokes are sequentially scanned from the bottom to the top.

Note that in this embodiment, the strokes are scanned from left to right, however, they may be scanned from right to left if the coordinates of "m" of the instruction are replaced with those of "d" of the same instruction. The plotting instruction execution section 56 switches a scanning direction based on instructions from the user. As described above, the plotting instruction execution section 56 may switch the scanning direction to a top-to-bottom or bottom-to-top direction based on the instruction from the user. Further, the scanning direction is not limited to the top-to-bottom or bottom-to-top direction. The plotting instruction execution section 56 may also switch the scanning direction to an obliquely upward or obliquely downward direction if the plotting instructions of such a direction are generated.

[Operation Procedure of Laser Projection Device 200]

Figure 10:
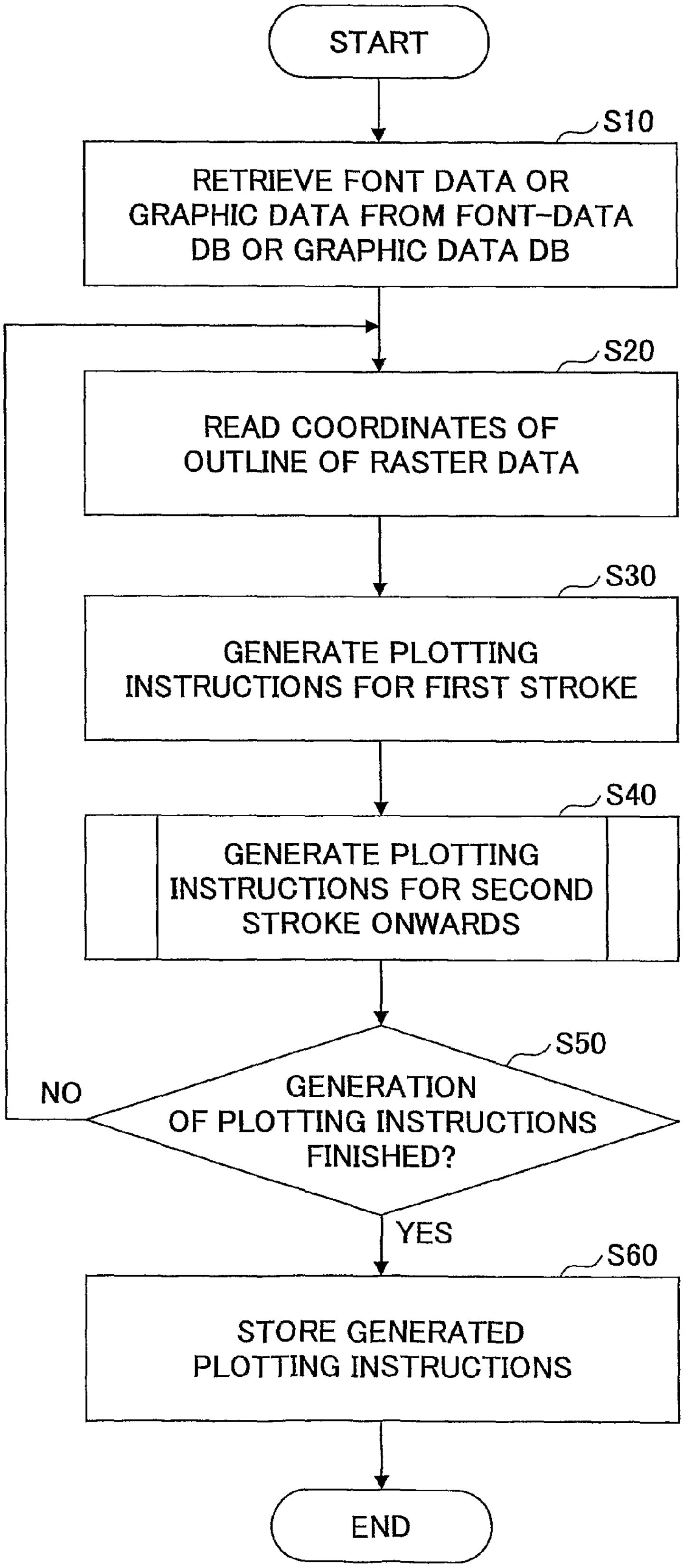
FIG. 10 is a flowchart illustrating an example of operations sequence of the laser projection device according to the embodiment of the invention.

FIG. 10 is a flowchart illustrating an example of operations sequence of the laser projection device according to the embodiment of the invention. In the flowchart of FIG. 10, the user operates the laser projection device 200 to initiate plotting of symbols, numbers, and graphics.

First, the plotting image acquisition section 51 retrieves font data or graphic data from a corresponding one of the font-data DB 41 and the graphic-data DB 42 (Step S10). The plotting instruction generation section 50 retrieves coordinates corresponding to one of the points of the outline of raster data; that is, the plotting instruction generation section 50 retrieves sets of coordinates of outlined points of the first stroke at a distance d/2 from the top of the raster data, and sets of coordinates of outlined points at a distance d from the preceding stroke when scanning outlined points of the second strokes onward (S20). The scanning start points of and the scanning end points of all the strokes are thus obtained.

The plotting instruction generation section 50 generates a set of plotting instructions one stroke at a time. Since the residual heat waiting time is not required for the first stroke, the plotting instruction generation section 50 generates a set of plotting instructions for the first stroke based on the coordinates obtained in step S20 (S30). In this flowchart, the traveling rate u is fixed to be the maximum rate, and the scanning rate v is fixed to be an adequate rate.

Figure 11:
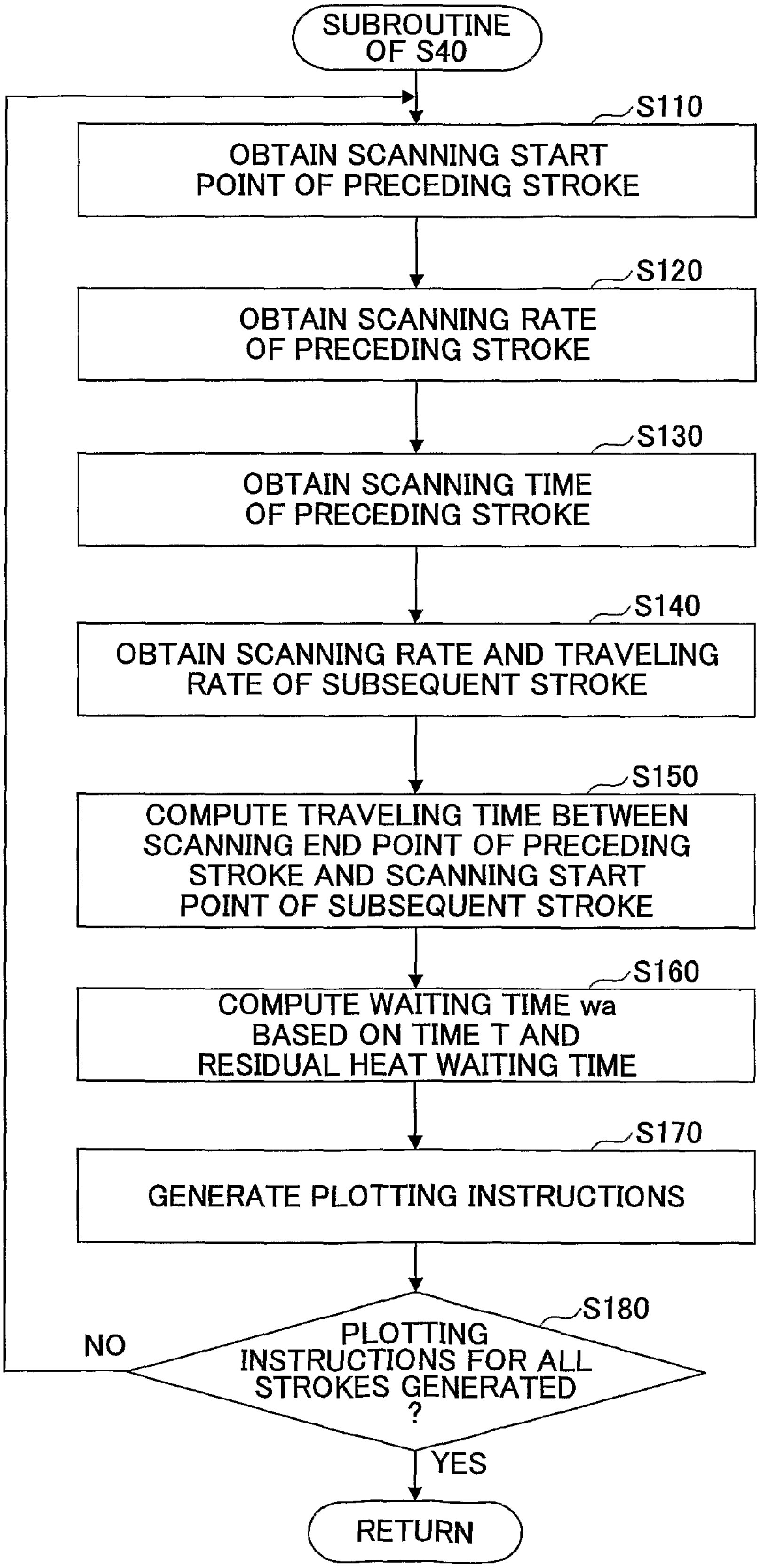
FIG. 11 is a flowchart illustrating a detailed procedure of the flowchart in Step S40 illustrated in FIG. 10.

Subsequently, the plotting instruction generation section 50 generates sets of plotting instructions for a second stroke and strokes subsequent to the second stroke (S40). FIG. 11 illustrates a detailed procedure of the flowchart in Step S40 of FIG. 10.

The scanning start time computation section 53 obtains the scanning start point of the preceding stroke (i.e., first stroke) (S110).

The scanning start time computation section 53 also obtains the scanning rate of the preceding stroke (S120). The scanning rate of the preceding stroke is already obtained from the plotting instructions that are already generated in the previous step.

The scanning start time computation section 53 also obtains the scanning rate of the preceding stroke (S130). Specifically, the scanning start time computation section 53 computes a first component of the time T of the equation (1). The scanning start point and the scanning end point of the preceding stroke are already known from the plotting instructions of the preceding stroke. The closest point determination section 61 computes a combination (pair) of respective closest points of the first and the second strokes.

The scanning start time computation section 53 then obtains the scanning start point of a subsequent stroke (i.e., second stroke) (S140). The scanning rate v and the traveling rate of the second stroke are set by the plotting rate computation section 52.

Thereafter, the scanning start time computation section 53 computes traveling time from the scanning end of the preceding stroke to the scanning start point of the subsequent stroke (S150). Specifically, the scanning start time computation section 53 computes a second component of the time T of the equation (1).

The waiting time computation section 531 computes the total time T of the traveling time obtained in Step S130 and that obtained in Step S150, and the waiting time wa based on the residual heat waiting time (S160). This is expressed by: Waiting time "wa"=residual heat waiting time−time T. Note that if the residual heat waiting time<time T, the waiting time "wa" can be set to zero.

At this point, all the factors of the current stroke are obtained, and thus the plotting instruction generation section 50 generates a set of plotting instructions for the subsequent stroke (S170). Note that alternatively, the traveling rate computation section 532 may compute (adjust) the traveling rate, and the scanning rate computation section 533 may compute (adjust) the scanning rate.

The plotting instruction generation section 50 determines whether the plotting instructions for all the strokes have been generated. If the plotting instructions for all the strokes have been generated, the process goes back to Step S50 in the flowchart of FIG. 10 (S180). Note that different adjustment factors such as the waiting time, traveling rate, and scanning rate may be mixed in the instruction for plotting one character or the like.

In Step S50 as illustrated in FIG. 10, the plotting instruction generation section 50 determines whether the plotting instructions for all the characters, symbols, numbers or graphics to be plotted on the rewritable medium 20 have been generated (S50). The plotting instructions for all the characters, symbols, numbers, and graphics can thus be generated (S20 to S50).

Having generated all the plotting instructions for the characters, symbols, or graphics, the plotting instruction storage section 55 stores the generated plotting instructions in the hard disk 35 (S60). The plotting instruction execution section 56 plots the characters, symbols, or graphics on the rewritable medium 20 based on the generated instructions.

[Plotting Procedure]

Figure 12:
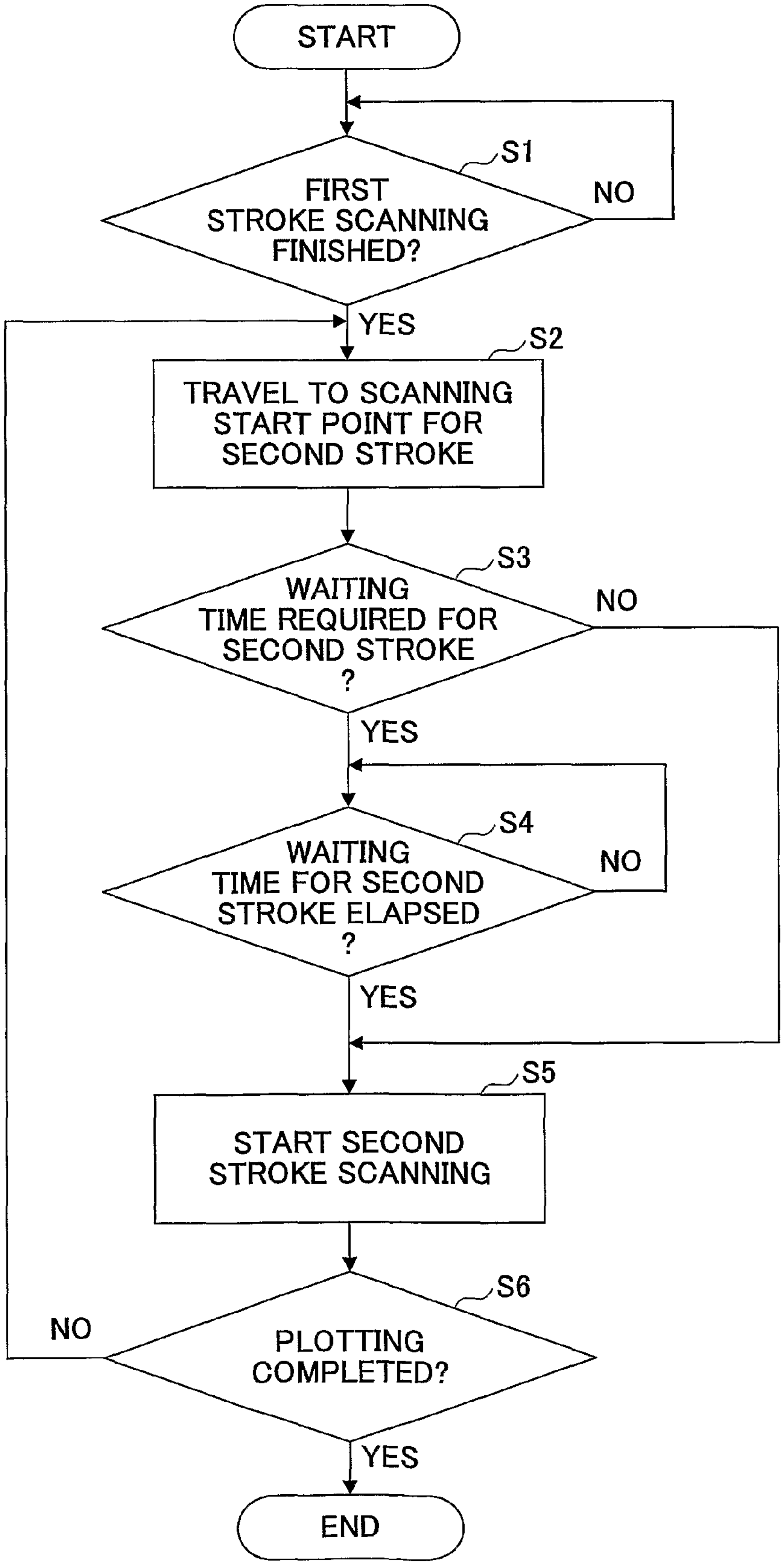
FIG. 12 is a flowchart illustrating another example of operations sequence of the laser projection device according to the embodiment of the invention.

FIG. 12 is a flowchart of a plotting procedure carried out by the laser projection device 200 according to the embodiment. The characters, symbols, or graphics are plotted on the rewritable medium 20 when the plotting instructions are generated.

Having sequentially retrieved a corresponding one of plural sets of plotting instructions, the plotting instruction execution section 56 plots characters, symbols, or graphics one at a time. The plotting instruction execution section 56 adjusts the optical lens 14 and converging lens 15 based on the stroke width t in the plotting instruction to thereby obtain a desired stroke width d. The plotting instruction execution section 56 then controls the laser beam projection position based on the scanning start point and the scanning end point of the first stroke to scan the first stroke.

Having scanned the first stroke (go to "YES" of S1) the plotting instruction execution section 56 moves the laser beam projection position to the scanning start point of the second stroke (S2). That is, the laser projection device 200 travels to the scanning start point of the second stroke based on the plotting instruction m.

The plotting instruction execution section 56 checks whether the waiting time wa is set for the second stroke (S3). If the waiting time is not set for the second stroke (go to "NO" of S3), the plotting instruction execution section 56 initiates the laser projection device 200 to scan the second stroke without having the waiting time wa (S5).

If the waiting time wa is set for the second stroke (go to "YES" of S3), the plotting instruction execution section 56 allows the laser projection device 200 to wait until the waiting time wa for the second stroke has elapsed (S4). After the waiting time wa for the second stroke has elapsed, the plotting instruction execution section 56 initiates the laser projection device 200 to scan the second stroke (S5).

The plotting instruction execution section 56 detects completion of plotting of the character, symbol, or graphic based on whether all the strokes for the character, symbol, or graphic have been scanned (S6). This procedure is repeated from Step S1 by scanning a last stroke as the first stroke until all the strokes for the character, symbol, or graphic have been scanned.

As described above, in the laser projection device 200 according to the embodiment, since the residual heat waiting time may be incorporated in the scanning time of the preceding stroke, time required for plotting an image may be minimized. Specifically, this procedure is effective when parallel straight lines are scanned in the same directions, or when the enclosed region (regardless of the presence of an outline; usually, the outline is not plotted when simply plotting a graphic) is solidly shaded. Note that as described later, the plotting method according to the first embodiment may also be utilized for plotting characters or symbols.

Second Embodiment

In this embodiment, the laser projection device 200 that scans a stroke by the method B is described. That is, the plotting instruction includes a waiting time wb, in which no residual heat interference is generated from "the scanning end time of a preceding stroke" to "the scanning start time of a subsequent stroke".

In the first embodiment, the scanning directions are uniform and the plotting time for plotting one graphic may be minimized, accordingly. However, in a case where a character or symbol is not required to be solidly shaded; that is, the strokes configure an outline of a character, symbol, or graphic, it may be more effective to immediately start scanning after moving the laser projection position from the scanning endpoint of the preceding stroke to the scanning start point of the subsequent stroke without having the waiting time wa of the plotting method A.

In the method B, the plotting instruction includes a waiting time wb, in which no residual heat interference is generated between "the scanning end time of a preceding stroke" and "the scanning start time of a subsequent stroke". In this method, the residual heat interference is simply prevented by setting the waiting time wb between the scanning end time of the preceding stroke" and the scanning start time of the subsequent stroke regardless of the scanning rates of the strokes.

Accordingly, the waiting time wb is simply set to prevent an adverse effect of the residual heat interference in the cases where the scanning rate is set to be a fixed value for every stroke, the scanning rate is set to be a different value for each stroke, or the scanning rate is set to be a variable for each stroke. In this embodiment, the traveling rate u may also be adjusted in the same manner as the first embodiment. It is not effective to adjust the scanning rate of the preceding stroke.

Figure 13:
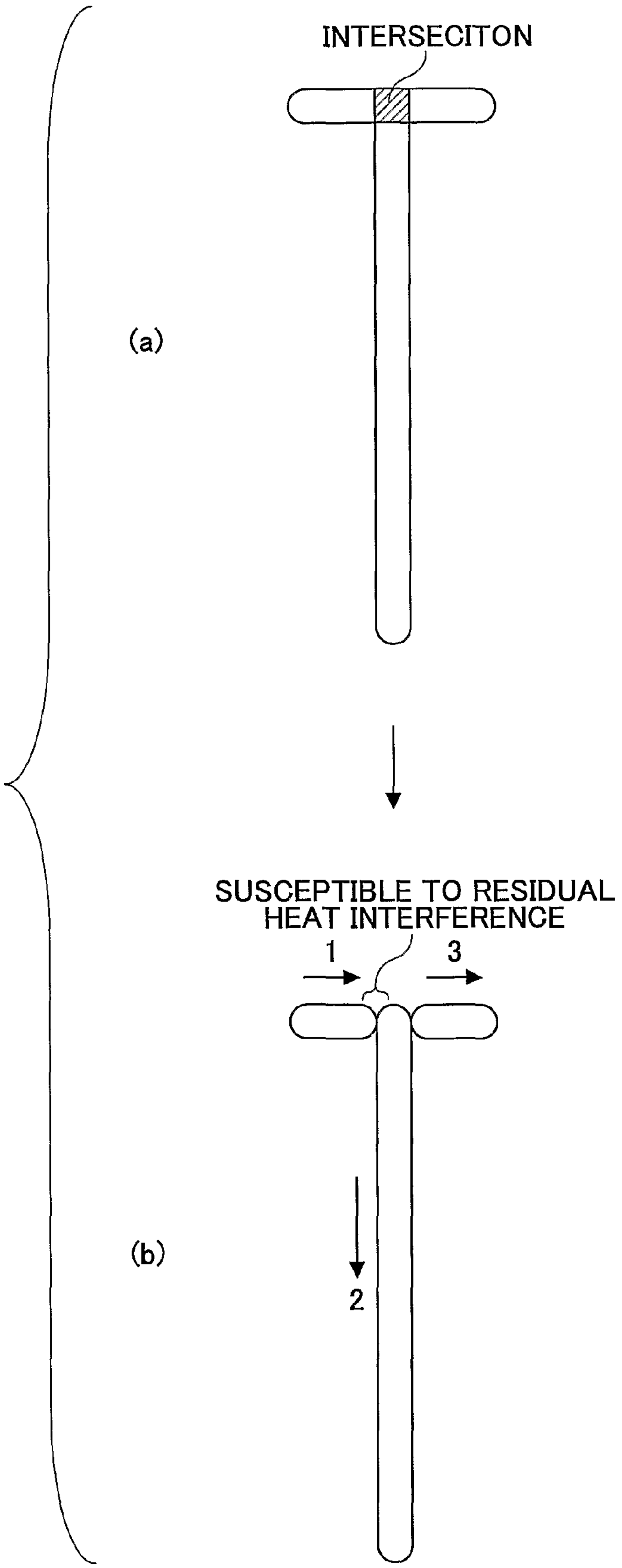
FIG. 13 is a diagram illustrating an example of stroke data of a symbol or character from which intersections are excluded.

FIG. 13 (*a*) illustrates an example of an undesirable character plotted by the laser projection device 200 according to the embodiment. As illustrated in FIG. 13 (*a*), in a case of plotting a character or symbol having an intersection, a laser beam is projected again onto the intersection of the preceding stroke while the intersection of the preceding stroke still has residual heat. As a result, the intersection is heated to a high temperature to adversely affect the rewritable medium 20.

Thus, in this embodiment illustrated in FIG. 13 (*b*), stroke data of the character or symbol having no intersection are generated. A method for generating the character or symbol without intersections is described later.

However, even if the character or symbol has no intersection, proximate portions between the strokes may still have an adverse effect of the residual heat interference. For example, as illustrated in FIG. 13 (*b*), it is not appropriate to scan the second stroke, immediately after having scanned the first stroke in a direction illustrated by an arrow. By contrast, there may be little adverse effect in a case of scanning a third stroke immediately after having scanned the second stroke. Accordingly, in this embodiment, whether the waiting time wb is included in the plotting instructions is determined based on an outcome obtained by comparing a distance L between the scanning end point of the preceding stroke and the scanning start point of the subsequent stroke with a predetermined threshold.

[Generation of Font Data without Intersections]

Figure 14:
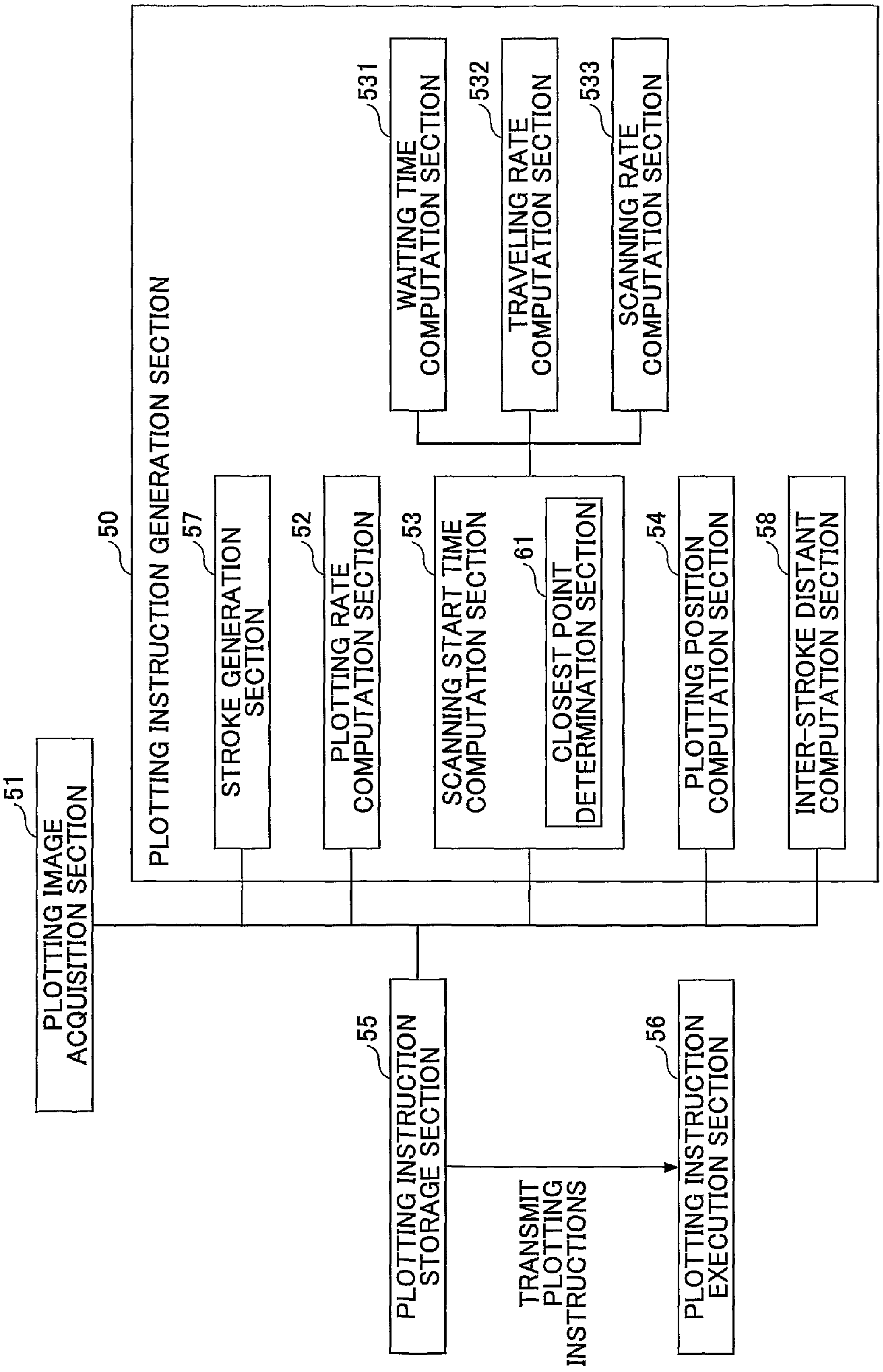
FIG. 14 is a functional block diagram illustrating an example of the laser projection device according to an embodiment of the invention (Second embodiment)

Next, generation of font data suitable for the laser projection device 200 is described. FIG. 14 illustrates an example of a functional configuration of the laser projection device 200 according to the second embodiment. Note that in FIG. 14, components identical to those of FIG. 3 are provided with the same reference numerals and the descriptions thereof are omitted. The functional configuration of the second embodiment illustrated in FIG. 14 is different from that of the first embodiment in that the second embodiment includes a stroke generation section 57 and an inter-stroke distant computation section 58. The stroke generation section 57 generates a stroke based on the font data, and the inter-stroke distance computation section computes a closest distance between the two strokes. Note that a method of generating a stroke excluding an intersection is described in more detail in Japanese Patent Application 2008-208631.

Figure 15A:
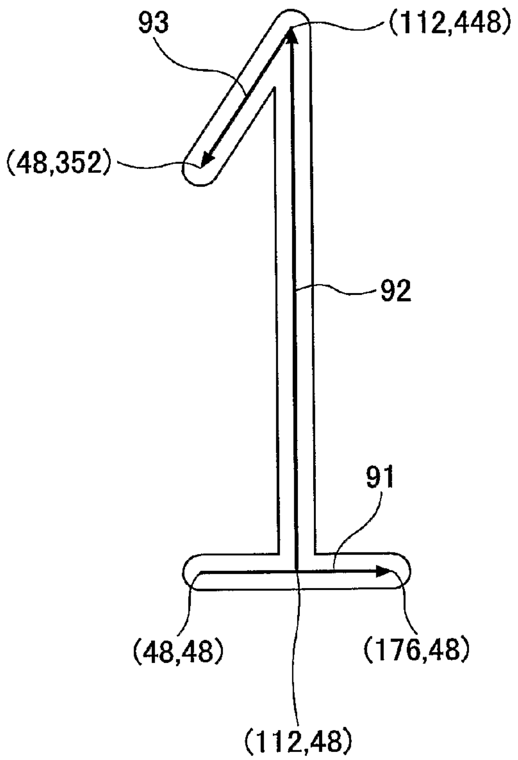
FIGS. 15A and 15B are diagrams each illustrating an example of font data.

FIG. 15A illustrates an example of the font data. This example represents font data of a character "1" composed of a stroke font. The stroke font employs combinations of specified lines (e.g., straight lines or curved lines) to describe the appearance of glyphs. The font data includes coordinates corresponding to endpoints of lines and a plotting order (hereafter, also called a "scanning order"). The coordinates are specified as an origin of a predetermined bitmap pixel when a character or a symbol is rasterized into bitmap data.

In the font data of FIG. 15A, a first image is composed of a set of coordinates from (48, 48) to (176, 48), a second image is composed of a set of coordinates from (112, 48) to (112, 448), and a third image is composed of a set of coordinates from (112, 448) to coordinates (48, 352).

The stroke generation section 57 generates a stroke suitable for the laser projection device 200 based on the aforementioned three lines. The stroke generation section 57 also determines whether there is an overlapping portion of the character based on the coordinates of the lines. Note that if there is no intersection but there are proximate portions of the two lines, the length of one line may need to be adjusted. Accordingly, the stroke generation section 57 computes the shortest distance between the two lines. The shortest distance between the two lines is obtained as follows:

If there is an intersection of the two lines, the closest distance between the two lines is zero. If, on the other hand, there is no intersection of the two lines, the closest distance is selected from the results obtained by the following methods:

- a distance between respective end points of the first and the second lines and
- a distance between end points of the first line and end points of the second line obtained by drawing lines from the ends of the first line perpendicular to the second line or by drawing lines from the ends of the second line perpendicular to the first line (provided that vertical lines are present). That is, if there is no intersection, the shortest distance between the two lines is selected from the results obtained by the above methods. Then, the stroke generation section 57 determines whether there is an overlapping portion of the two lines based on the obtained shortest distance.

Among the detected distances, if there is a distance shorter than the width of the character, there is an overlapping portion of the two lines. Note that in this case, since the length of the overlapping portion of the two lines=character width—the shortest distance between the two lines, the length of one of the two lines is reduced by the obtained length of the overlapping portion.

Figure 15B:
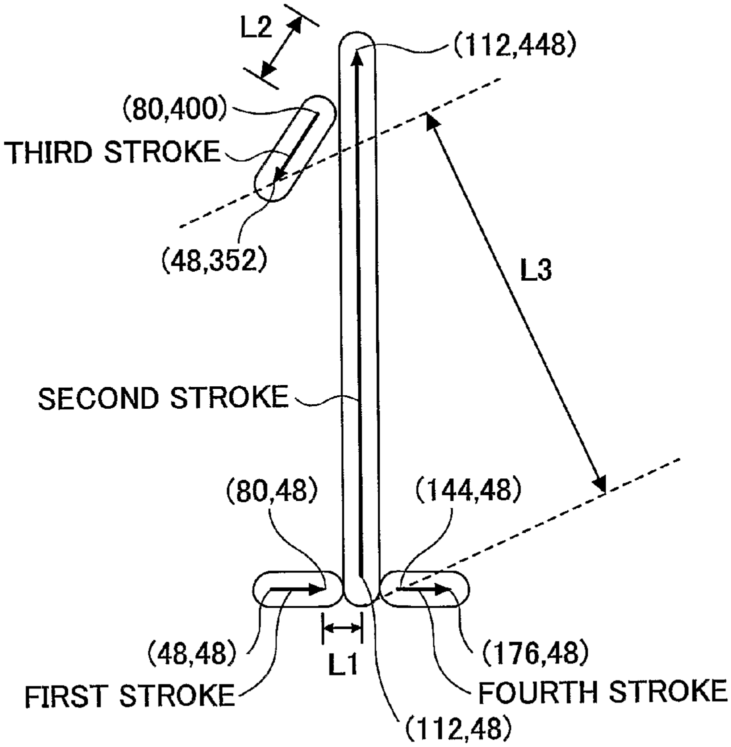

FIG. 15B illustrates an example of a plotted number "1" from which overlapped portions (intersections) are excluded. In FIG. 15B, the number "1" having the obtained width may be plotted based on intensity of laser projection, respective lens positions or focal distances of the optical lens 14 and converging lens 15, and the position of the rewritable medium 20.

Although the number "1" of FIG. 15A is composed of three lines, that of FIG. 15B obtained as a result of excluding the overlapping portions is composed of four lines.

The first stroke includes coordinates of the scanning start point of (48, 48), and coordinates of the scanning end point of (80, 48);

the second stroke includes coordinates of the scanning start point of (112, 48), and coordinates of the scanning end point of (112, 448);

the third stroke includes coordinates of the scanning start point of (80, 400), and coordinates of the scanning end point of (48, 352); and the fourth stroke includes coordinates of the scanning start point of (144, 48), and coordinates of the scanning end point of (176, 48).

In this process, it is preferable that the scanning order (or plotting order) be reset, however, in this embodiment, the number "1" of FIG. 15B is scanned in the order of the first, second, third, and fourth strokes based on the original scanning order.

Note that in this embodiment, the strokes are generated so as to exclude the overlapping portions from the number "1" for purposes of illustration. However, the strokes for characters or symbols are generated in advance, because there is a fixed set of font data for each language such as Japanese and English. Accordingly, the stroke generation section 57 may be omitted in this case.

[Computation of Inter-Stroke Distance]

Next, computation of an inter-stroke distance is described. An inter-stroke distance may be computed between the strokes, the scanning order of which is sequential, however, the inter-stroke distance may alternatively be computed between all the strokes, regardless of the scanning order. In the latter case, if a distance between the strokes mutually having temporally-separated scanning order (e.g., second and fourth strokes) is short, the waiting time wb is set in the plotting instructions. Although the plotting time gets longer in this case, the residual heat interference between the strokes that are scanned in a short distance may be eliminated.

If the inter-stroke distance is computed between the strokes the scanning order of which is sequential, the inter-stroke distant computation section 58 computes inter-stroke distances between combinations of sequential strokes in the scanning order. As illustrated in FIG. 15B, the inter-stroke distant computation section 58 computes a distance L1 between the scanning endpoint (80, 48) of the first stroke and the scanning start point (112, 48) of the second stroke. Likewise, the inter-stroke distant computation section 58 computes a distance L2 between the scanning endpoint (112, 448) of the second stroke and the scanning start point (80, 400) of the third stroke. Moreover, the inter-stroke distant computation section 58 computes a distance L3 between the scanning end point (48, 352) of the second stroke and the scanning start point (144, 48) of the fourth stroke. Hereafter, the following distances L1 to L3 are simply called a distance L.

$$L1=\sqrt{\{(112-80)^2+(48-48)^2\}}$$

$$L2=\sqrt{\{(80-112)^2+(400-448)^2\}}$$

$$L3=\sqrt{\{(144-48)^2+(48-352)^2\}}$$

In a case where distances between all the strokes are computed, regardless of the scanning order, the inter-stroke distant computation section 58 computes distances L between the first stroke and a corresponding one of the second through fourth strokes, distances L between the second stroke and a corresponding one of the third and fourth strokes, and a distance L between the third and fourth strokes. That is, the inter-stroke distant computation section 58 computes distances L for every combination of the strokes. Subsequently, the inter-stroke distant computation section 58 computes a distance L between the closest ends of every combination of the strokes.

<Setting of Waiting Time "wb">

Next, setting of waiting time wb is described. The scanning start time computation section 53 does not set the waiting time wb for the plotting instructions if the obtained distance L exceeds a threshold, whereas the scanning start time computation section 53 sets a fixed waiting time wb for the plotting instructions if the obtained distance L is equal to or lower than the threshold.

Figure 16:
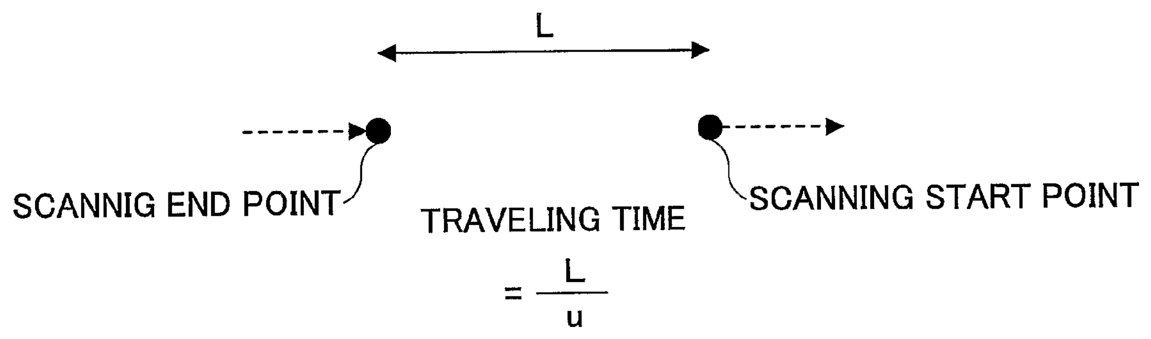
FIG. 16 is a diagram illustrating an example of a relationship between a distance L and a threshold.

FIG. 16 illustrates an example of a relationship between the distance L and the threshold. If a subsequent stroke is scanned before the residual heat waiting time has elapsed, the rewritable medium 20 may be adversely affected. Since there is traveling time between the scanning end point of the preceding stroke and the scanning start point of the subsequent stroke (i.e., to which the laser beam projection position is moved), it is not preferable that the traveling time be shorter than the residual heat waiting time.

The traveling time is obtained by the following equation:

$$\text{Traveling time}=\text{distance } L/\text{traveling rate } u.$$

Accordingly, in order to satisfy the relationship represented by the traveling time>the residual heat waiting time, the distance L>the residual heat waiting time*the traveling rate u. Thus, the threshold with which the distance L is compared is obtained by the following equation:

$$\text{Threshold}=\text{Residual heat waiting time}*\text{Traveling rate } u.$$

Note that the threshold may alternatively be obtained by experiments.

If the distance L<the threshold, the scanning start time computation section 53 sets the waiting time wb to be the plotting instructions of the stroke. In this embodiment, the distances L1 and L2 are below the threshold. Further, the distances L between all the strokes are below the threshold.

Note that the waiting time wb to be set is a fixed value for all the strokes; however, the waiting time wb to be set may alternatively be a variable value according to the obtained difference between the distance L and the threshold. That is, the scanning start time computation section 53 sets a long waiting time wb for the plotting instructions if "the obtained difference=threshold−the distance L" is large. Alternatively, the waiting time wb is obtained by the following formula:

$$\text{Residual heat waiting time}-\text{traveling time}$$

[Plotting Instructions for Font Data]

The scanning start point and scanning endpoint of each stroke are already obtained. Accordingly, if a character, symbol, or number has a fixed stroke width t, traveling rate u, and scanning rate v, the plotting instructions can be generated by obtaining the waiting time wb. FIGS. 17A and 17B each illustrate the plotting instructions of the number "1". In FIG. 17A, the distances L are computed between the strokes that are carried out in the sequential scanning order and the waiting time wb is set for the corresponding instructions if the obtained distance L is below the threshold. In FIG. 17B, on the other hand, the distances L are computed between all the strokes regardless of the sequential scanning order and the waiting time wb is set for the corresponding instructions if the obtained distance L is below the threshold. Note that the stroke width "t" and traveling rate "u" are fixed values for every stroke, so that they are not set for the instructions for the second stroke onwards.

As illustrated in the example of FIG. 17A, among the distances L1 through L3, the distances L1 and L2 are below the threshold, and hence the waiting time wb is set for the plotting instructions for the second and third strokes. By contrast, as illustrated in the example of FIG. 17B, all the distances L between the strokes are below the threshold, and hence, the waiting time wb is set for the plotting instructions of the fourth stroke in addition to the second and third strokes.

[Operation Procedure of Laser Projection Device 200]

Figure 18:
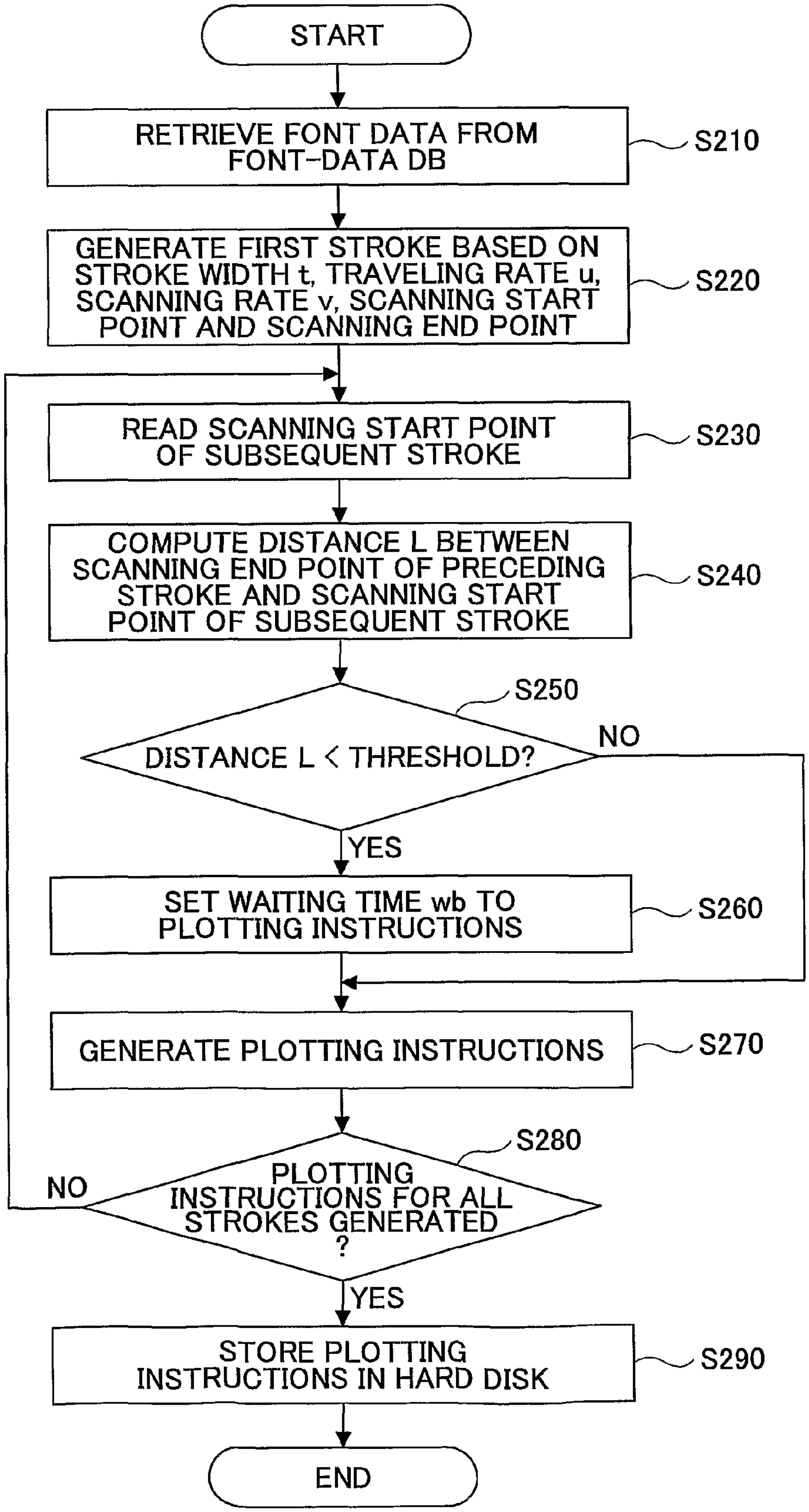
FIG. 18 is a flowchart illustrating an example of operations sequence of the laser projection device according to an embodiment of the invention (Third embodiment)

FIG. 18 is a flowchart of operations procedure carried out by the laser projection device 200 according to the embodiment. The flowchart of FIG. 18 illustrates operations procedure in a case where a user operates the laser projection device 200 to plot a character or symbol. The steps of the flowchart start processing when the user plots the character or symbol with the laser projection device 200. FIG. 18 illustrates the procedure if the distances L are computed between the strokes that are carried out in the sequential scanning order and the waiting time wb is set for the instructions if the corresponding obtained distance L is below the threshold.

First, the plotting image acquisition section 51 retrieves font data of a character or symbol from the font-data DB 41 (S210). Note that in this flowchart, the strokes for the character or symbol are already generated based on the font data of such a character or symbol.

The plotting instruction generation section then generates plotting instructions for an initial stroke. Note that the plotting instructions are generated for one stroke at a time. The initial stroke does not include a waiting time wa factor in the plotting instructions because there is no residual heat interference. Thus, the plotting instruction generation section 50 generates plotting instructions based on the stroke width t, traveling rate u, scanning rate v, scanning start point and scanning end point (S220). The traveling rate u and scanning rate v include respective fixed values so that the traveling rate u and scanning rate v are set to be the respective maximum rates.

Subsequently, the inter-stroke distant computation section 58 retrieves a scanning start point of a subsequent stroke (S230). The inter-stroke distant computation section 58 then computes a distance L between a scanning end point of a preceding stroke and the scanning start point of the subsequent stroke (S240).

The scanning start time computation section 53 then determines whether the computed distance L is below a threshold (S250). If the computed distance L is equal to or more than the threshold ("NO" of S250), the scanning start time computation section 53 does not set the waiting time wb for the plotting instructions. If the computed distance L is below the threshold ("YES" of S250), the scanning start time computation section 53 sets the waiting time wb for the plotting instructions (S260).

Thereafter, the plotting instruction generation section 50 generates plotting instructions based on the traveling rate u, scanning rate v, scanning start point, scanning end point and waiting time wb (if required) (S270).

The plotting instruction generation section 50 checks whether the plotting instructions for all the strokes have been generated (S280), and generates plotting instructions of ungenerated strokes (S230 to S270).

Having generated the plotting instructions for a character or symbol, the plotting instruction storage section 55 stores the generated plotting instructions in the hard disk 35 (S290). The plotting instruction execution section 56 plots the characters, symbols, or graphics on the rewritable medium 20 based on the generated instructions.

As illustrated so far, in a case where characters, symbols, and numbers are plotted by the laser projection device 200 according to the second embodiment, the residual heat interference may be prevented by providing the waiting time wb between the scanning end point of the preceding stroke and the scanning start point of the subsequent stroke. That is, according to the second embodiment, the residual heat interference may be prevented by simply setting the waiting time wb for the plotting instructions.

Third Embodiment

The first embodiment illustrates a method in which an enclosed region is plotted by being solidly shaded whereas the second embodiment illustrates a method in which a character, symbol, or number is plotted by combining the strokes. Note that a graphic may be solidly shaded by setting the waiting time wb described in the second embodiment; however, the plotting time may increase if the scanning direction is not constant due to an increase of the waiting time wb. Accordingly, it is preferable that the plotting method A or B be selectable based a subject to be plotted (hereafter also called "plotting subject") such as a character, symbol, number, or graphic on the rewritable medium 20. The third embodiment describes a laser projection device 200 that can select one of the plotting methods A and B based on the plotting subject.

Figure 19:
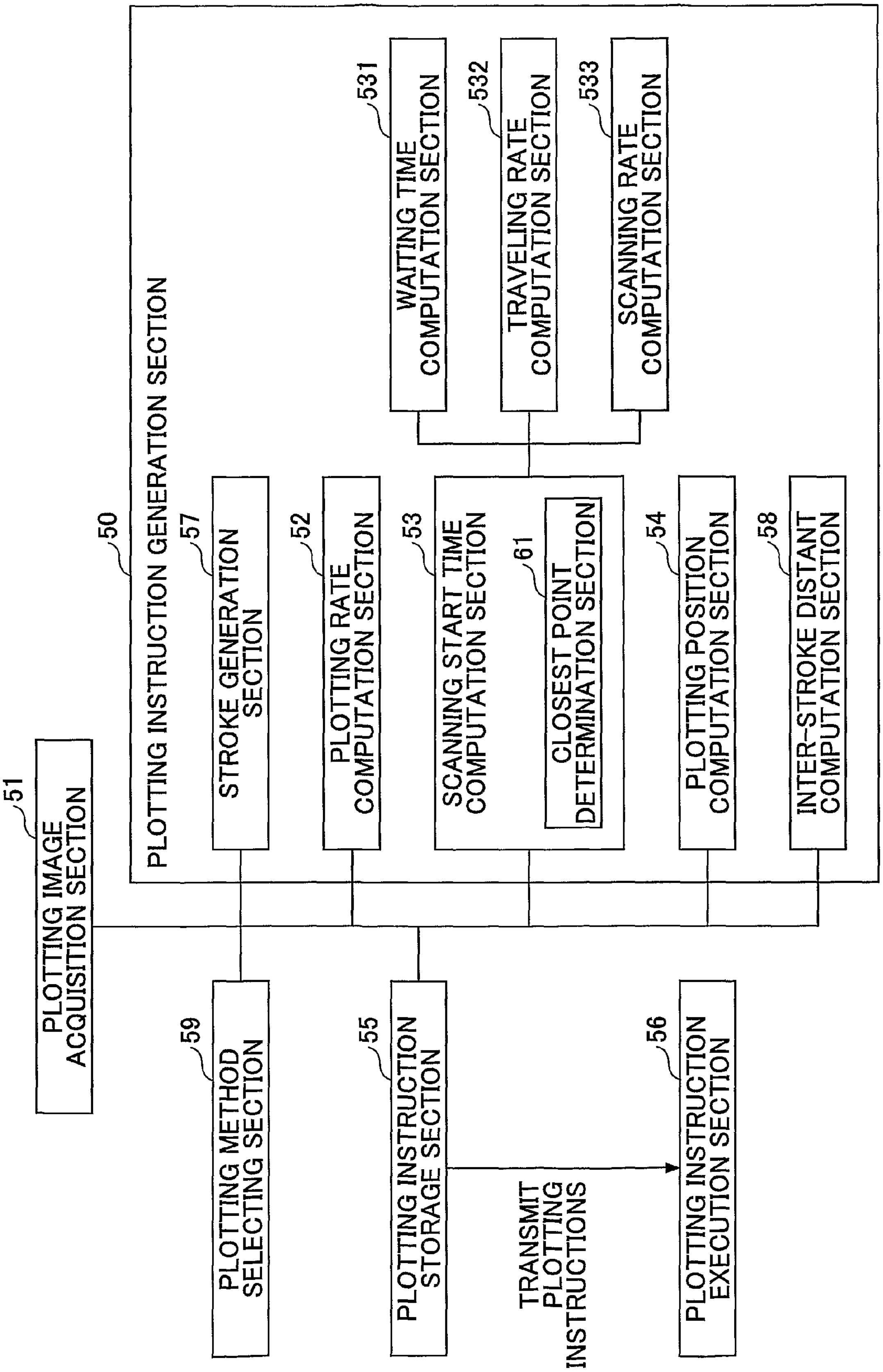
FIG. 19 is a functional block diagram illustrating an example of the laser projection device according to the embodiment of the invention (Third embodiment)

FIG. 19 illustrates an example of functional components of the laser projection device 200 according to the third embodiment. Note that in FIG. 19, components identical to those of FIG. 14 are provided with the same reference numerals and the descriptions thereof are omitted. The functional configuration of the third embodiment illustrated in FIG. 19 is different from that of the second embodiment in that the third embodiment includes a plotting method selecting section 59.

The plotting method selecting section 59 generates plotting instructions by selecting one of the plotting methods A and B based on the plotting subject. Specifically, the plotting method selecting section 59 selects the plotting method B for plotting a stroke font but selects the plotting method B for plotting the plotting subject other than the stroke font. The font data and graphic data each include identification information for identifying types of data and identifying an optimal plotting instruction generation method. Alternatively, font data and graphic data may be stored by respective character encoding schemes to be stored in different storages so that the plotting method selecting section 59 selects one of the plotting methods A and B for each set of the characters, symbols, numbers, and graphics based on a corresponding one of the character encoding schemes.

For example, in a case of a plotting subject composed of combinations of characters and a symbol such as "Company A→Company B" (here, "→" is a unit of graphic data illustrated in FIG. 5), the plotting method selecting section 59 selects the plotting method B so that the plotting instruction generation section 50 generates the plotting instructions for plotting "Company A" based on the plotting method B, and subsequently, the plotting method selecting section 59 determines that "→" is a graphic and selects the plotting method A so that the plotting instruction generation section 50 generates the plotting instructions for plotting "→" based on the plotting method A. Further, after the generation of the plotting instructions for "→", the plotting method selecting section 59 determines that "Company B" is a character (i.e., stroke font) and selects the plotting method B so that the plotting instruction generation section 50 generates the plotting instructions for plotting "Company B" based on the plotting method B. Accordingly, the optimal plotting method may be selected based on the corresponding plotting subjects. Since the formats of the plotting instructions are the same, the laser projection device 200 may plot the plotting subjects without having any adverse effect by changing the plotting methods between A and B.

Figure 20:
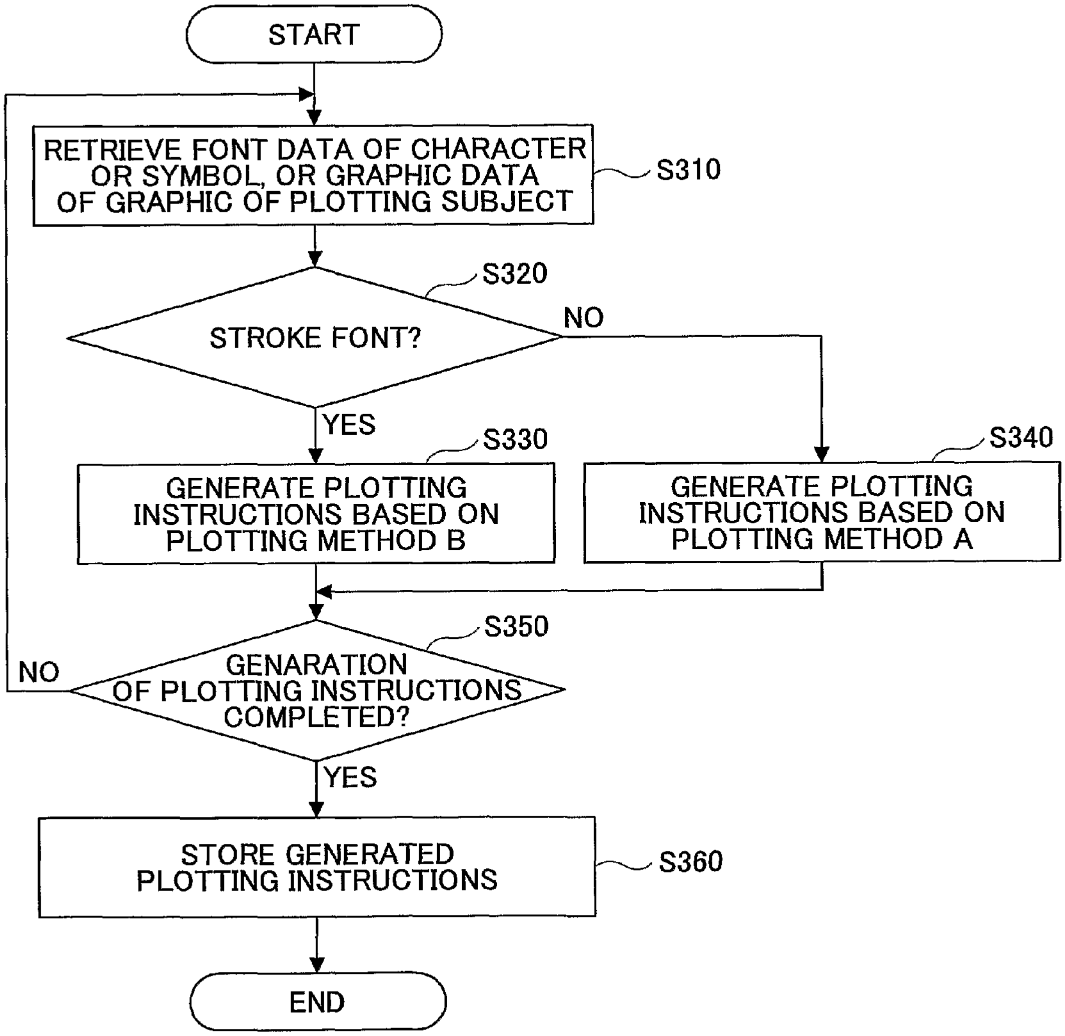
FIG. 20 is a flowchart illustrating another example of operations sequence of the laser projection device according to the embodiment of the invention (Third embodiment)

FIG. 20 is a flowchart of operations procedure carried out by the laser projection device 200 according to the embodiment. The flowchart of FIG. 20 illustrates operations procedure in a case where a user operates the laser projection device 200 to plot a character or symbol. The steps of the flowchart start when the user plots the character or symbol with the laser projection device 200.

First, the plotting image acquisition section 51 retrieves font data of a character, symbol, or number from the font-data DB 41 and a set of graphic data from the graphic DB (S310).

The plotting method selecting section 59 determines whether a plotting subject is a stroke font (S320). If the plotting subject is a stroke font ("YES" of S320), the plotting instruction generation section 50 generates plotting instructions based on the plotting method B (S330). Specifically, the plotting instruction generation section 50 generates the plotting instructions of steps S210 to S270 illustrated in FIG. 18.

If the plotting subject is not a stroke font ("NO" of S320), the plotting instruction generation section 50 generates plotting instructions based on the plotting method A (S340). Specifically, the plotting instruction generation section 50 generates the plotting instructions of steps S20 to S40 illustrated in FIG. 10.

The plotting instruction generation section 50 reiterates steps S310 to S340 until plotting instructions for the all the characters, symbols, numbers, or graphics of the plotting subject (S350) are generated. Having generated the plotting instructions for all the characters, symbols, numbers and graphics, the plotting instruction storage section 55 stores the generated plotting instructions in the hard disk 35 (S360).

In the laser projection device 200 according to the third embodiment, stroke fonts can be plotted with simple control and graphics to be solidly shaded can be plotted at the fastest rate by simply changing the plotting method based on a plotting subject. That is, the optimal plotting method may be selected based on the corresponding plotting subject.

Fourth Embodiment

In the first embodiment, plotting instructions to make an enclosed region of a plotting subject solidly shaded at the fastest plotting rate are generated by setting the waiting time wa (i.e., plotting method A). Note that the waiting time wa in the first embodiment includes the scanning start time of the preceding stroke and the scanning start time of the subsequent stroke to wait until no adverse effect is generated due to residual heat interference. However, alternatively, plotting instructions to make an enclosed region of a plotting subject solidly shaded at the fastest plotting rate are generated by setting the plotting method B. As illustrated in the second embodiment, the residual heat interference is simply prevented by setting the waiting time wb between the scanning end time of the preceding stroke and the scanning start time of the subsequent stroke regardless of the scanning rate of each stroke.

Figure 21:
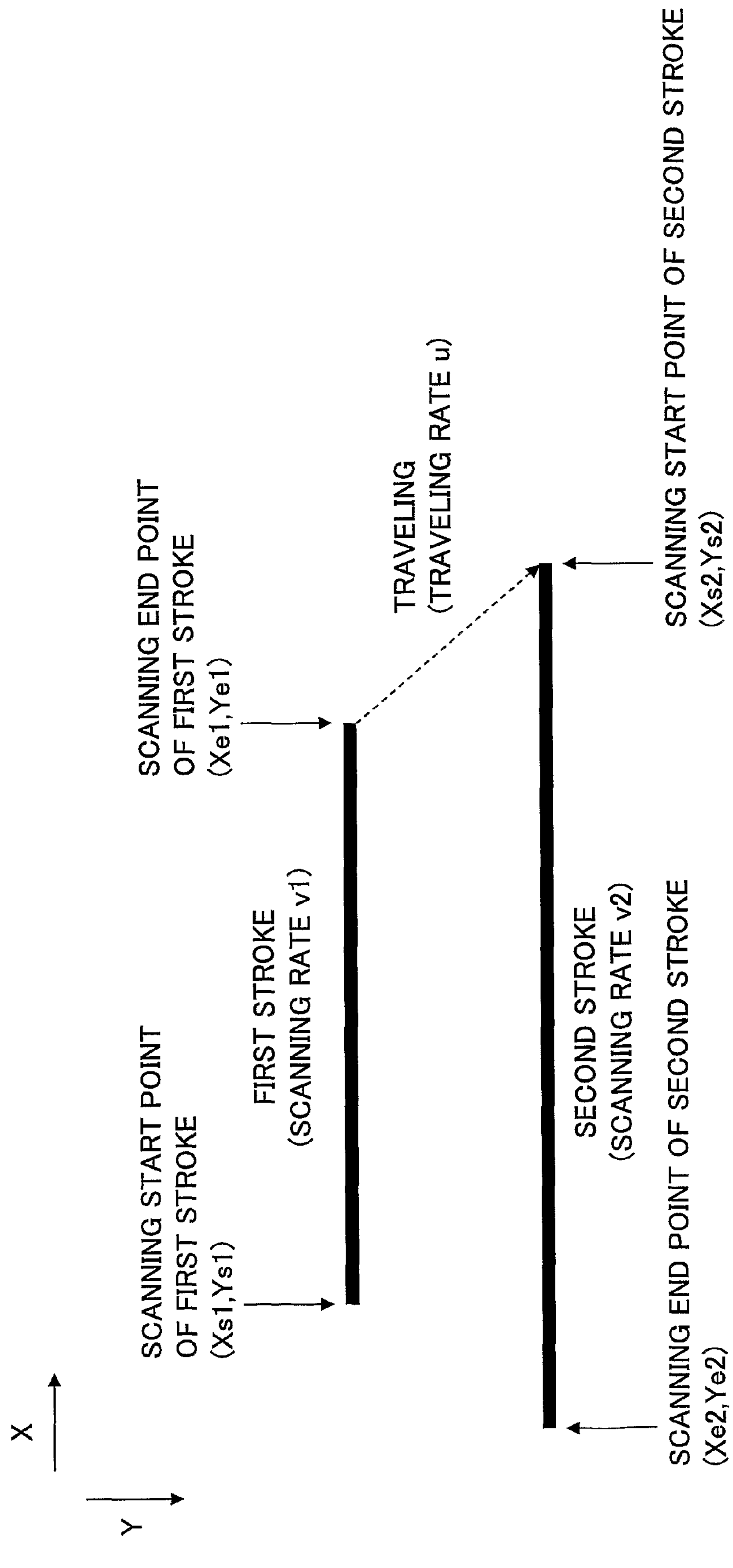
FIG. 21 is a diagram illustrating an example of strokes and scanning directions of the strokes when an enclosed region is solidly shaded.

FIG. 21 illustrates an example of strokes and scanning directions when an enclosed region is solidly shaded. As illustrated in FIG. 21, the scanning start point (Xs1, Ys1) and the scanning end point (Xe1, Ye1) of the first stroke are initially scanned, and the scanning start point (Xs2, Ys2) and the scanning end point (Xe2, Ye2) of the second stroke are subsequently scanned. Thus, the scanning direction of the first stroke and that of the second stroke is alternately changed.

If the strokes are scanned by alternately changing the scanning directions so as to make the enclosed region of a graphic solidly shaded as illustrated above, the traveling time from the scanning endpoint of the preceding stroke to the scanning start point of the subsequent stroke gets short so that it may not be sufficient to only allocate the traveling time to the residual heat waiting time. Thus, in the laser projection device 200 according to the fourth embodiment, the waiting time wb is set for the plotting instructions for the subsequent stroke when the enclosed region of a graphic is solidly shaded.

Figure 22:
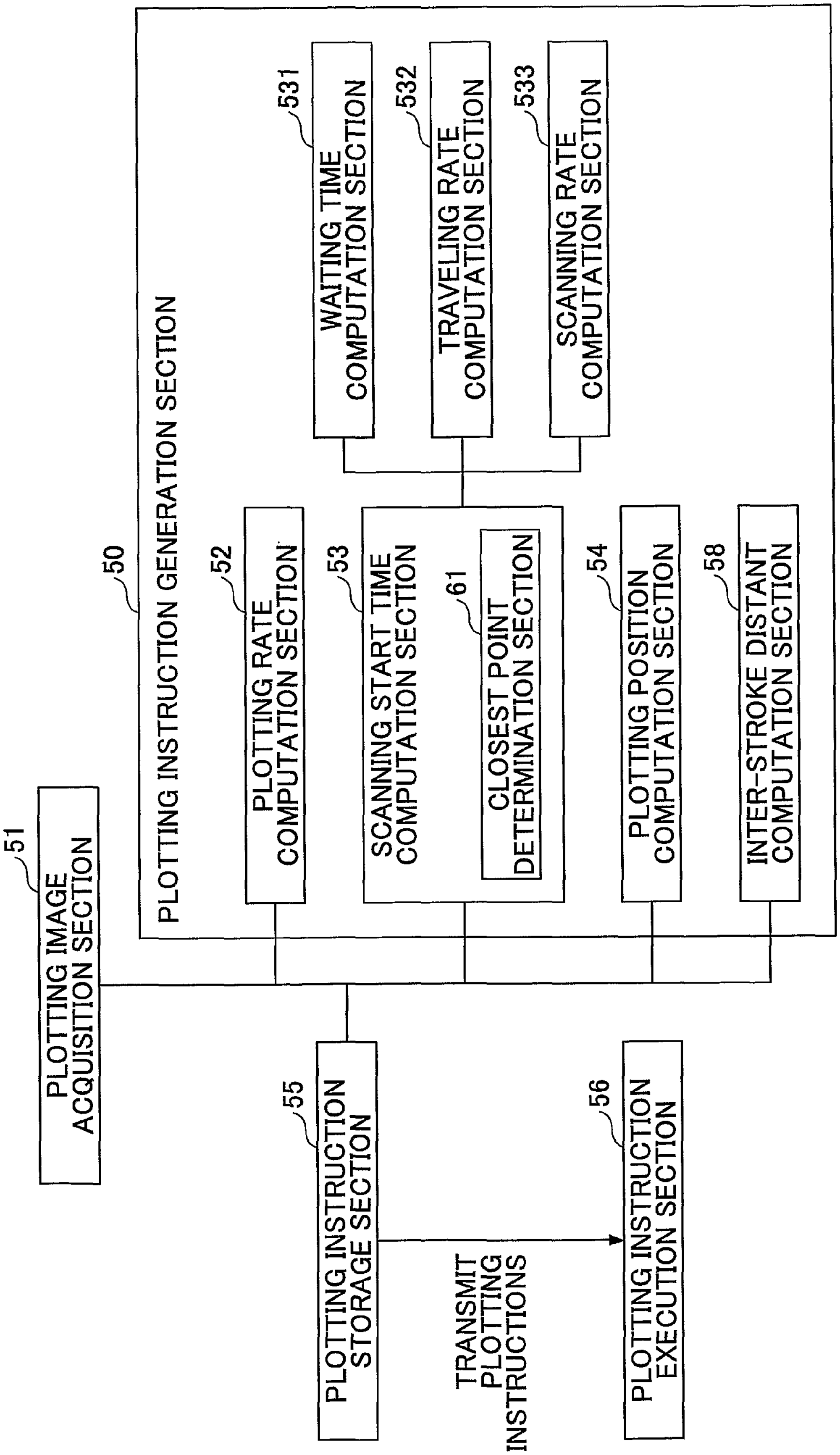
FIG. 22 is a functional block diagram illustrating an example of the laser projection device according to an embodiment of the invention (Fourth embodiment)

FIG. 22 illustrates an example of functional components of the laser projection device 200 according to the fourth embodiment. Note that in FIG. 22, components identical to those of FIGS. 3 and 14 are provided with the same reference numerals and the descriptions thereof are omitted. The inter-stroke distant computation section 58 computes a distance L between the scanning end point of the preceding stroke and the scanning start point of the subsequent stroke in a manner similar to that of the second embodiment. Note that in the generation of plotting instructions according to the fourth embodiment, the scanning start point and scanning end point are determined in a manner similar to that of the first embodiment, and the waiting time wb is set in a manner similar to that of the second embodiment.

First, how the scanning start point and scanning end point are determined is described. The plotting position computation section 54 reads coordinates of an outline of raster data as illustrated in FIGS. 4A and 4B; however, the read left coordinates and right coordinates of the outline corresponding to the scanning start point and scanning end point are alternately switched for each stroke. For example, in scanning the first stroke from left to right direction, the plotting position computation section 54 defines the left coordinates of the outline as the scanning start point and the right coordinates of the outline as the scanning end point. However, since the second stroke is scanned from right to left, the plotting position computation section 54 defines the right coordinates of the outline as the scanning start point and the left coordinates of the outline as the scanning end point. Accordingly, the plotting instruction generation section 50 may generate the plotting instructions, in which the scanning directions are alternately changed for each stroke, based on the raster data.

Next, the waiting time "wb" according to the fourth embodiment is described. The scanning start time computation section 53 computes traveling time by dividing the distance L between the scanning endpoint of the preceding stroke and the scanning start point of the subsequent stroke by the traveling rate u, and subtracts the computed traveling time from the residual heat waiting time. The scanning start time computation section 53 then computes the waiting time wb by the following equation to set the computed waiting time wb for the plotting instructions.

$$\text{Waiting time "}wb\text{"=residual heat waiting time}-L/u$$

Specifically, if the residual heat waiting time is longer than the traveling time in which the laser beam projection position is moved from the scanning end point of the preceding stroke to the scanning start point of the subsequent stroke without the laser beam projection, the obtained difference between the residual heat waiting time and the traveling time (i.e., remainder of the residual heat waiting time) is set to be the waiting time wb. However, if the obtained distance L is sufficiently long, the waiting time wb will be equal to the residual heat waiting time. The plotting instructions of the fourth embodiment are the same as those of the first embodiment as illustrated in FIG. 4, and the descriptions thereof are thus omitted. In the fourth embodiment, the traveling rate u may also be adjusted in the same manner as the first embodiment. However, since the scanning end point of the first stroke is often located close to the scanning start point of the second stroke, the adjustment of the traveling rate u may not be effective in the fourth embodiment. It may also not be effective to adjust the scanning rate of the preceding stroke.

Figure 23:
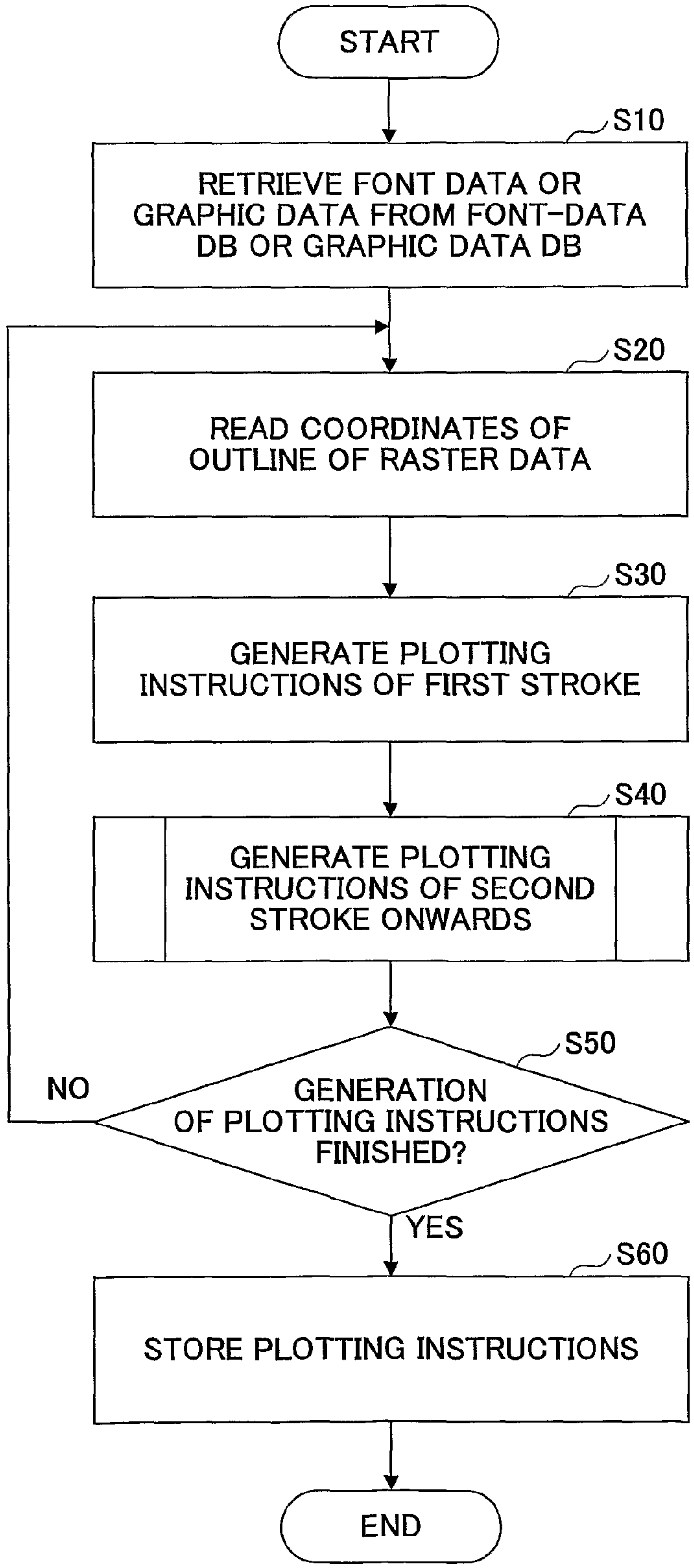
FIG. 23 is a flowchart illustrating an example of operations sequence of the laser projection device according to the embodiment of the invention (Fourth embodiment)
Figure 24:
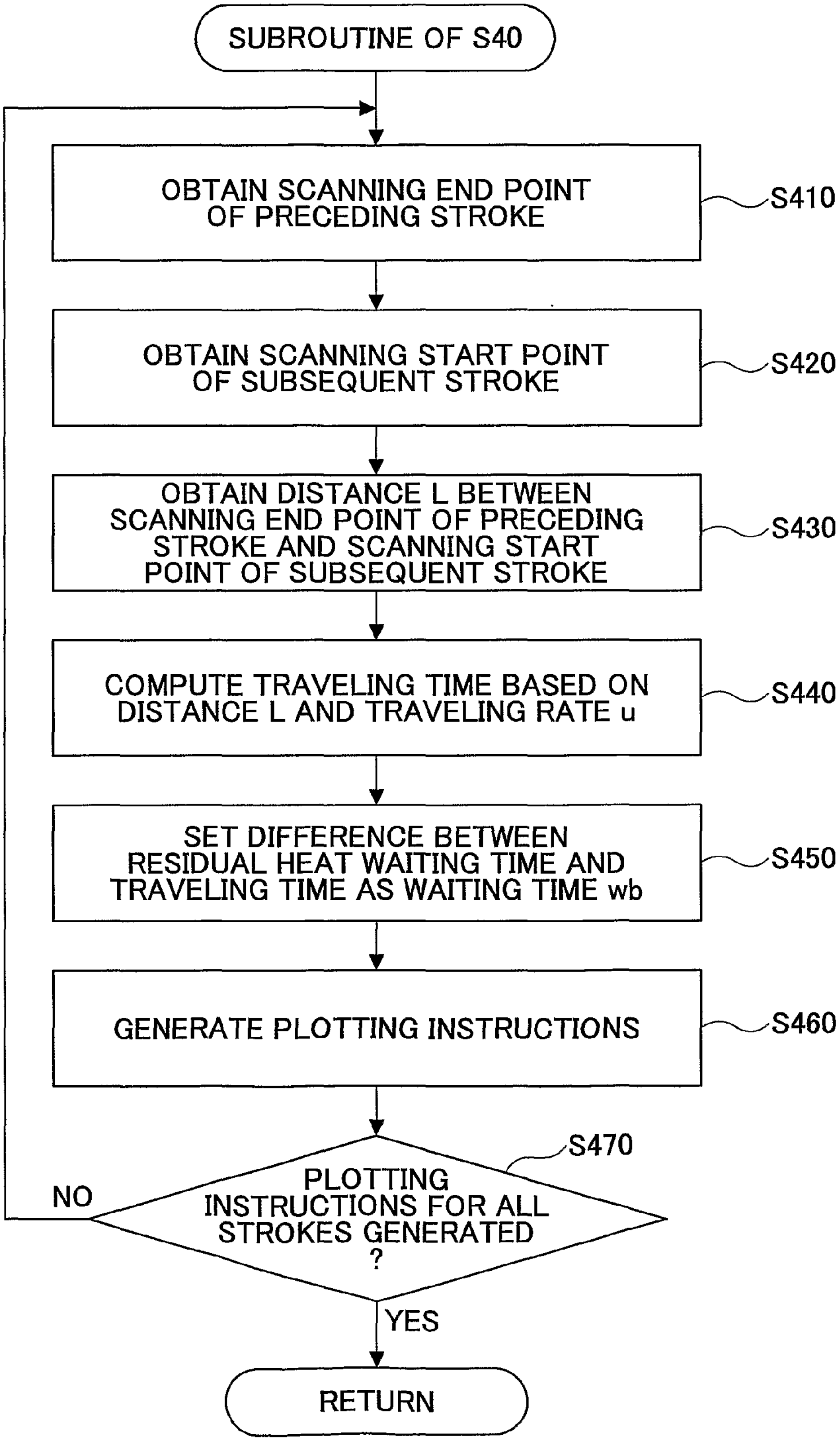
FIG. 24 is a flowchart illustrating a detailed procedure of Step S40 of the flowchart of FIG. 23.

FIG. 23 is a flowchart of operations procedure carried out by the laser projection device 200 according to the fourth embodiment. The flowchart the fourth embodiment illustrated in FIG. 23 is similar to that of the first embodiment illustrated in FIG. 10, but has a difference in a subroutine of Step S40. Accordingly, in the fourth embodiment, only a detailed procedure of the subroutine of Step S40 is described by referring to a flowchart of FIG. 24.

In generating the plotting instructions from the second stroke onward, the scanning start time computation section 53 obtains a scanning end point of a preceding stroke (S410).

The scanning start time computation section 53 also obtains a scanning start point of a subsequent stroke (S420).

The inter-stroke distant computation section 58 then computes a distance L between the scanning end point of the preceding stroke and the scanning start point of the subsequent stroke (S430).

The scanning start time computation section 53 computes traveling time based on the distance L between the scanning end point of the preceding stroke and the scanning start point of the subsequent stroke and the traveling rate u corresponding to the distance L (S440).

The scanning start time computation section 53 sets the difference between the residual heat waiting time and the obtained traveling time as the waiting time wb (S450).

At this point, all the factors of the current stroke are obtained, and thus the plotting instruction generation section 50 generates a set of plotting instructions for the subsequent stroke (S460).

The plotting instruction generation section 50 checks whether the plotting instructions for all the strokes have been generated (S470), and generates plotting instructions for ungenerated strokes. If the plotting instructions for all the strokes have been generated, the process goes back to Step S50 of the flowchart of FIG. 23.

In the laser projection device 200 according to the fourth embodiment, an enclosed region of a graphic may be solidly shaded by simply providing the waiting time wb between the strokes, without having an adverse effect due to the residual heat interference and regardless of the scanning rate.

Fifth Embodiment

So far, there are provided the descriptions of the laser projection device 200 in which plotting instructions for graphic data are generated by the plotting method A and the laser projection device 200 in which plotting instructions for font data and graphic data are generated by the plotting method B. However, the plotting instructions for font data may be generated by any one of the plotting methods A and B if characters, symbols, and numbers are all defined as graphics.

Figure 25A:
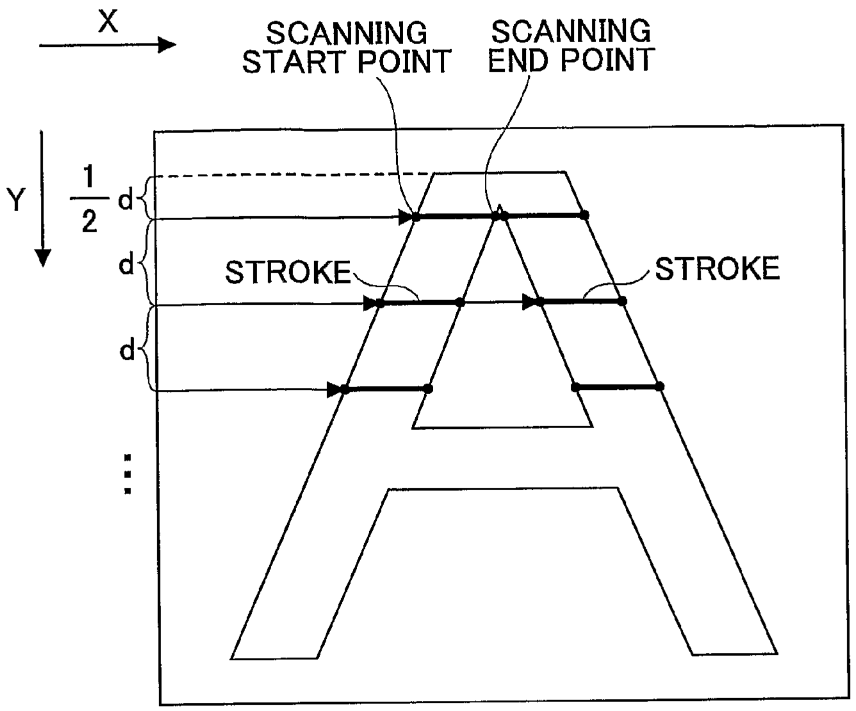
FIGS. 25A, 25B, 25C are diagrams each schematically illustrating an example of generation of plotting instructions for characters and symbols.
Figure 25B:
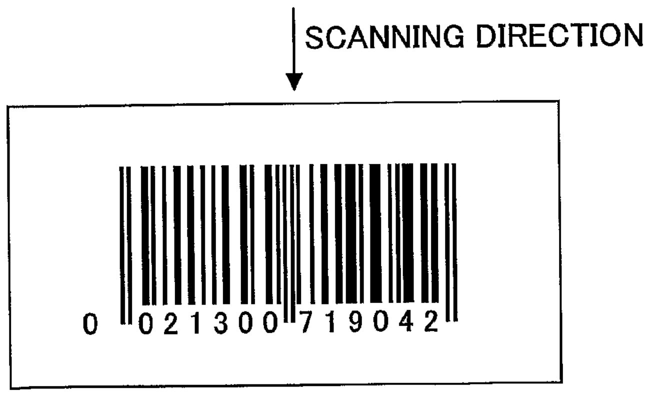
Figure 25C:
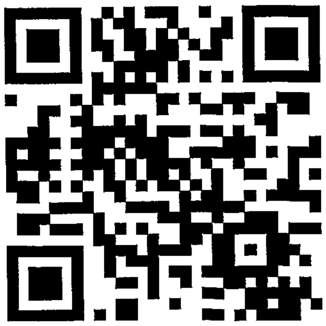
Figure 26A:
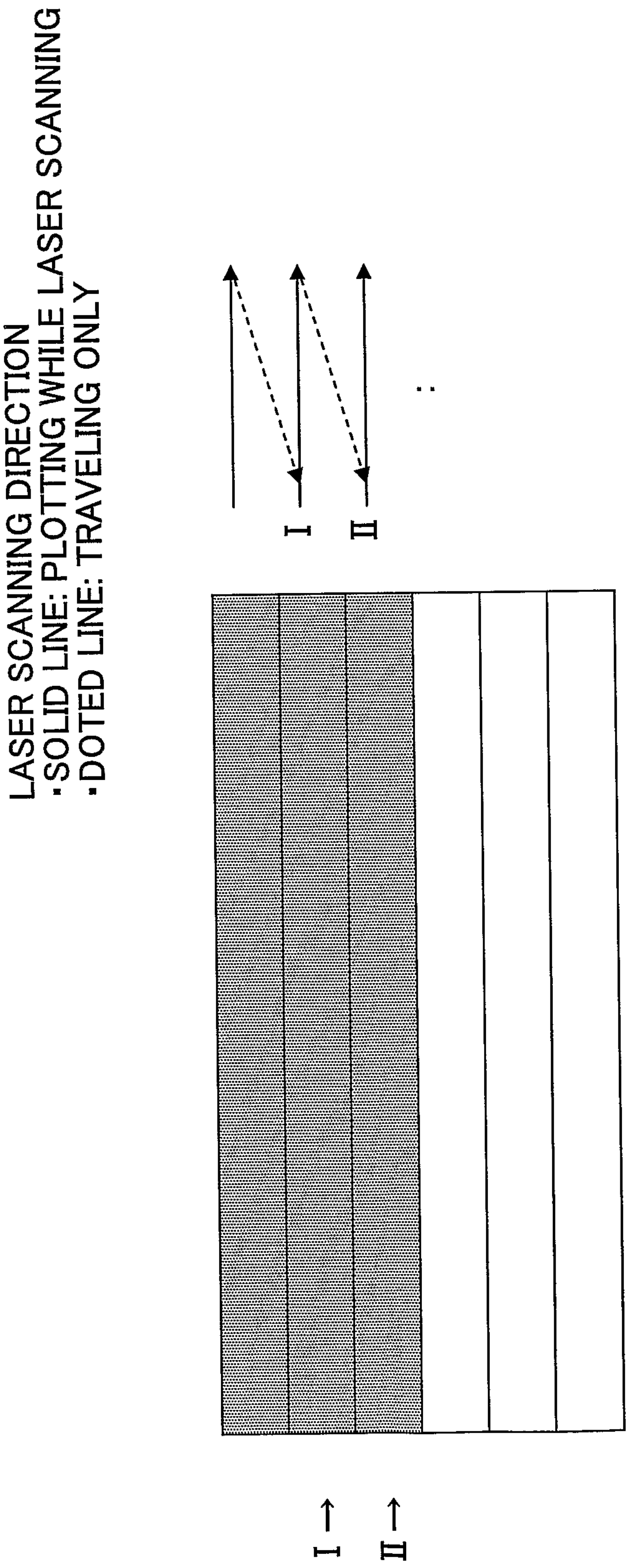
FIGS. 26A and 26B are diagrams each illustrating an example of raster scanning an enclosed region.
Figure 26B:
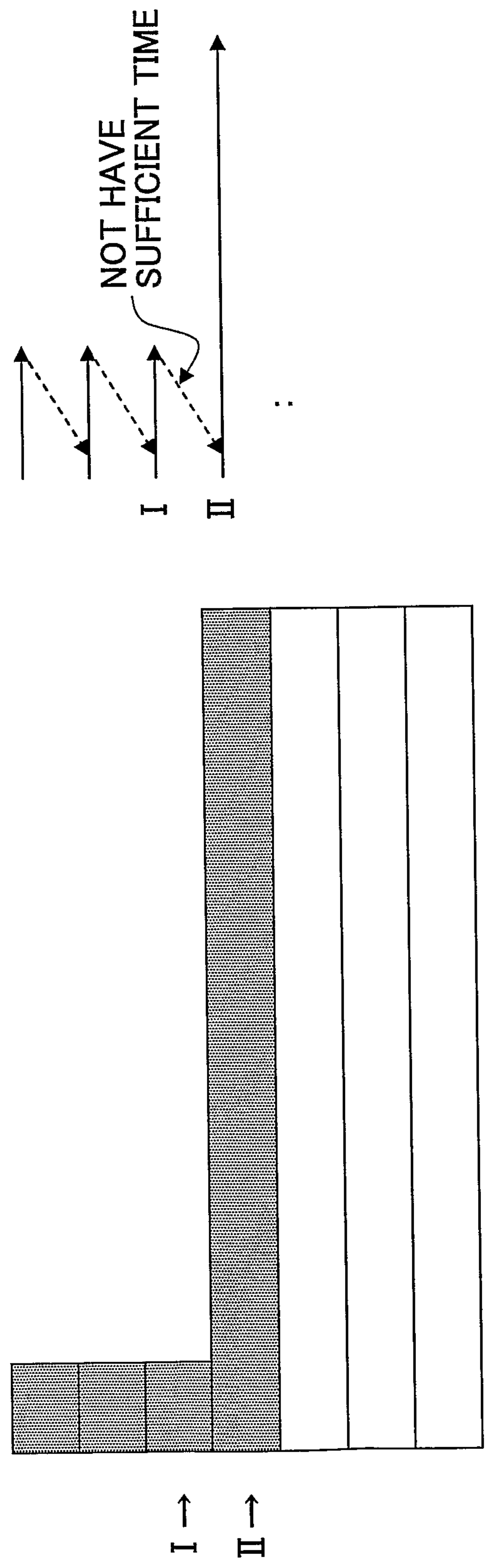
Figure 27:
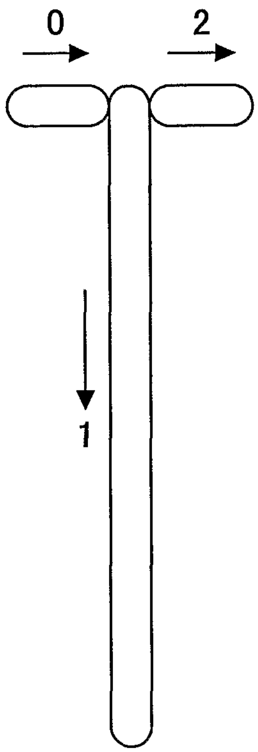
FIG. 27 is a diagram illustrating residual heat interference in scanning a symbol.

FIGS. 25A, 25B, and 25C schematically illustrate examples of generation of plotting instructions for a character, symbol, or number. Fonts include bitmap fonts and outline fonts, based on which the plotting instructions are generated in a manner similar to that of graphics. An outline font, for example, describes a glyph such as a character by rasterizing font data represented by parameters of Bézier curves. Note that the outline fonts include stroke fonts in a broad sense.

FIG. 25A illustrates a process in which an outline font "A" is rasterized into a raster image having a desired size. As illustrated in FIGS. 5A and 5B, the plotting position computation section 54 may obtain the scanning start point and scanning end point of each stroke by reading coordinates of an outline of raster data. As illustrated in FIG. 25A, in plotting a character having an intricate structure, the plotting instructions for different strokes are generated on the same coordinate (i.e., y-coordinate) in the Y-axis direction.

The methods for setting the waiting time wa and wb are the same as those described in the first and fourth embodiments, respectively. If the scanning direction is constant similar to that of the first embodiment, it is effective to control the traveling rate u and the scanning rate v1 of the first stroke.

That is, the plotting instructions for the outline font involve solidly shading an outlined character. Accordingly, the scanning directions may be fixed directions for all the strokes similar to that of first embodiment, or may be alternately changing directions for each stroke (in y-axis directions) similar to that of fourth embodiment. Further, the scanning directions may be a combination of the fixed directions and the alternately changing directions while scanning a character. In plotting the outline font, since a character is solidly shaded as mentioned above, the plotting time may be reduced by scanning strokes in fixed directions (plural strokes starting on the same y-coordinate). By contrast, if the scanning directions may be alternately changed to directions opposite to the preceding directions each time the scanning directions shift in the directions of the y-coordinate.

The laser projection device 200 also generates plotting instructions for plotting barcodes or two-dimensional barcodes in addition to the plotting instructions for characters and symbols. The barcodes or two-dimensional barcodes may be scanned in the same manner as scanning the arrow as described earlier; the plotting instructions for the barcodes or two-dimensional barcodes may also be generated in the same manner as those of the first embodiment or fourth embodiment. FIG. 25B illustrates an example of the barcode, and FIG. 25C illustrates an example of the two-dimensional barcode.

The barcode is composed of vertical straight lines aligned in a parallel direction. Accordingly, the number of strokes to be plotted may be reduced if laser beams are projected in y-axis directions. Further, if the laser beams are projected in the y-axis directions to form a barcode, plotting errors (i.e., roundness of the line) formed at the scanning start point and scanning end point of each stroke may be prevented. Accordingly, reading error may be prevented while the barcode is read by the scanner.

As described above, the laser projection device 200 according to the fifth embodiment can generate plotting instructions for binary format images (i.e., raster data) such as characters, symbols, numbers or graphics to plot the binary format images on the rewritable medium 20.

In the laser projection device 200 according to the fifth embodiment, plotting time may be reduced to the minimum when an enclosed region of a graphic is solidly shaded while avoiding the residual heat interference between the strokes. Further, in the laser projection device 200 according to the fifth embodiment, characters, symbols, or numbers formed of stroke fonts may be plotted by simply adding the waiting time wb to the plotting instructions or the like. That is, the plotting method may be optimized based on corresponding desired subjects or visible information to be plotted. Further, plotting time may be reduced even if an enclosed region such as an outline font or a barcode is plotted to be solidly shaded.

Note that the present disclosures employ the rewritable medium 20 as an example of a medium to which characters, symbols, numbers, or images are printed by the application of laser beams but the example is not limited thereto. The technologies disclosed in the present disclosures are effective in any general materials such as thermal paper, plastic or metallic materials. For example, the present technology may be applicable to a plastic bottle onto which characters or graphic are printed due to thermal melting of the surface caused by intense laser beam irradiation. With plastic materials, the application of excessive heat causes nonuniform heat transmission. For example, a certain portion of the plastic material may be inconsistently engraved due to nonuniform intensity of heat transmission, or visible information may be formed in the unintended portion other than an intended scanning portion due to heat transmission to a peripheral area beyond the intended scanning portion. Accordingly, printing quality may be degraded.

However, according to the technologies of the present disclosures, even in a case where a preceding short stroke is scanned and a subsequent stroke is immediately scanned at a position close to the preceding stroke, generation of residual heat interference can be prevented by computing the waiting time between the two strokes based on the time between a scanning start time of the preceding stroke and a scanning start time of the subsequent stroke and the residual heat waiting time. The technologies are particularly effective in reduction of plotting time when two parallel lines are scanned in the same directions.

The technologies of the present disclosures may provide a control device that is capable of reducing, when plotting a plurality of strokes on a thermal rewritable medium, residual heat interference between the strokes; a laser projection device having the control device; a recording method for reducing, when plotting a plurality of strokes on a thermal rewritable medium, residual heat interference between the strokes; a computer program for executing the recording method, and a storage medium containing the computer program.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiment of the present invention has been described in detail, it should be understood that various changes, substitutions, and alterations could be made hereto without departing from the spirit and scope of the invention.

This patent application is based on Japanese Priority Patent Application No. 2008-308956 filed on Dec. 3, 2008, and Japanese Priority Patent Application No. 2009-235614 filed on Oct. 9, 2009, the overall contents of which are hereby incorporated herein by reference.

The invention claimed is:

1. A control device for controlling a visible information forming device that forms visible information on a medium by varying positions of energy transmission, the control device comprising:

a shape information storage configured to store a set of shape information on desired visible information to be plotted;

a stroke generation unit configured to retrieve the set of shape information on the visible information to be plotted from the shape information storage to generate a first stroke data set and a second stroke data set each having transmission start coordinates and transmission end coordinates of a corresponding one of the first stroke and second stroke based on the retrieved set of shape information on the visible information to be plotted;

a scanning start time computation unit configured to determine a scanning start time of the second stroke by adjusting, when one of first points forming the first stroke made visible by energy scanning based on the generated first stroke data set and one of second points forming the second stroke made visible, subsequent to the energy scanning of the first stroke, by energy scanning based on the generated second stroke data set are selected to have a shortest distance therebetween, one of a first waiting time to start scanning the second stroke, a traveling rate from the transmission end coordinates of the first stroke to the transmission start coordinates of the second stroke, and respective scanning rates of the first and the second strokes so as to have a desired time interval between scanning the selected one of first points of the first stroke and scanning the selected one of second points of the second stroke;

a plotting instruction generation unit configured to generate a first set of plotting instructions including the transmission start coordinates and the transmission end coordinates of the first stroke, and a second set of plotting instructions including the scanning start time of the second stroke and the transmission start coordinates and the transmission end coordinates of the second stroke;

a plotting instruction storage configured to store the generated first set of plotting instructions including the transmission start coordinates and the transmission end coordinates of the first stroke, and the generated second set of plotting instructions including the scanning start time of the second stroke and the transmission start coordinates and the transmission end coordinates of the second stroke; and a plotting instruction execution unit configured to execute the stored first set of plotting instructions including the transmission start coordinates and the transmission end coordinates of the first stroke, and the stored second set of plotting instructions including the scanning start time of the second stroke and the transmission start coordinates and the transmission end coordinates of the second stroke to plot the visible information on the medium.

2. The control device as claimed in claim 1, wherein the scanning start time computation unit includes a closest point acquisition unit configured to compute distances between the first points of the first stroke and the second points of the second stroke, and select one of the first points and one of the second points of the respective first and second strokes that have a shortest distance therebetween as a first closest point and a second closest point of the respective first and second strokes, and a time computation unit configured to compute a time interval between scanning the first closest point of the first stroke and scanning the second closest point of the second stroke, and wherein the scanning start time computation unit determines, provided that the computed time interval between the scanning of the first closest point of the first stroke and the scanning of the second closest point of the second stroke is shorter than a predetermined residual heat decrease time in which an effect of residual heat on the medium decreases, the scanning start time of the second stroke by adjusting the one of a first waiting time to start scanning the second stroke, a traveling rate from the transmission end coordinates of the first stroke to the transmission start coordinates of the second stroke, and the respective scanning rates of scanning the first stroke and the second stroke so as to increase the computed time interval between the scanning of the first closest point of the first stroke and the scanning of the second closest point of the second stroke to be equal to or longer than the predetermined residual heat decrease time.

3. The control device as claimed in claim 2, wherein provided that the closest point acquisition unit obtains the first and the second closest points of the respective first and second strokes having the shortest distance therebetween, the time computation unit selects one of the combinations of the first and the second closest points of the respective first and second strokes having the shortest distance therebetween that has a shortest time interval to compute a value of the shortest time interval between the selected combination of the first and the second closest points of the respective first and second strokes.

4. The control device as claimed in claim 1, wherein the scanning start time computation unit includes a first waiting time computation unit configured to compute the first waiting time to start scanning the second stroke based on a time interval between a scanning start time of the first stroke and the scanning start time of the second stroke and a predetermined residual heat decrease time in which an effect of residual heat on the medium decreases, and wherein the scanning start time computation unit determines the scanning start time of the second stroke based on the computed first waiting time to start scanning the second stroke.

5. The control device as claimed in claim 1, wherein the scanning start time computation unit includes a second waiting time computation unit configured to compute second waiting time to start scanning the second stroke based on a time interval between a scanning end time of the first stroke and the scanning start time of the second stroke and a predetermined residual heat decrease time in which an effect of residual heat on the medium decreases, and wherein the scanning start time computation unit determines the scanning start time of the second stroke based on the computed second waiting time to start scanning the second stroke.

6. The control device as claimed in claim 4, wherein the scanning start time computation unit adjusts the traveling rate from the transmission end coordinates of the first stroke to the transmission start coordinates of the second stroke based on a value obtained by dividing a traveling distance between the transmission end coordinates of the first stroke and the transmission start coordinates of the second stroke by the computed first waiting time to start scanning the second stroke.

7. The control device as claimed in claim 1, wherein the first and the second sets of plotting instructions each further includes information on the scanning rates of a corresponding one of the first and the second strokes and the traveling rate from the transmission end coordinates of the first stroke to the transmission start coordinates of the second stroke, and wherein the plotting instruction execution unit controls respective scanning rates of the first and the second strokes based on the information on the corresponding scanning rates of the first and the second strokes and the traveling rate from the transmission end coordinates of the first stroke to the transmission start coordinates of the second stroke.

8. The control device as claimed in claim 2, further comprising:

a scanning rate computation unit configured to adjust the respective scanning rates of the first and the second strokes such that a total of scanning time of the first stroke and a traveling time computed based on a traveling distance between the transmission end coordinates of the first stroke and the transmission start coordinates of the second stroke approximates the predetermined residual heat decrease time.

9. The control device as claimed in claim 1, wherein the stroke generation unit determines the transmission start coordinates and the transmission end coordinates of the first and the second strokes such that the first and the second strokes are scanned in uniform directions.

10. The control device as claimed in claim 1, wherein the stroke generation unit determines the transmission start coordinates and the transmission end coordinates of the first and the second strokes such that the first and the second strokes are scanned in alternately inverted directions.

11. The control device as claimed in claim 1, wherein the stroke generation unit detects the transmission start coordinates and the transmission end coordinates of the first and the second strokes based on an outline of a bitmap data set.

12. The control device as claimed in claim 1, wherein the stroke generation unit detects the transmission start coordinates and the transmission end coordinates of the first and the second strokes based on an outline of a raster data set of a corresponding one of one-dimensional and two-dimensional barcodes.

13. The control device as claimed in claim 1, wherein the shape information storage includes a font-data storage that stores the transmission start coordinates and the transmission end coordinates of the first and the second strokes each forming a line of a character, a number, or a symbol, and an order of scanning the lines thereof, wherein the plotting instruction generation unit includes a distance computation unit configured to compute a distance between the transmission end coordinates of the first stroke and the transmission start coordinates of the second stroke retrieved from the font-data storage, and a second waiting time computation unit configured to compute, when the computed distance between the transmission end coordinates of the first stroke and the transmission start coordinates of the second stroke is equal to or shorter than a predetermined threshold, a second waiting time to start scanning the second stroke, and wherein the plotting instruction generation unit generates the first set of plotting instructions including the transmission start coordinates and the transmission end coordinates of the first stroke, and the second set of plotting instructions including the second waiting time to start scanning the second stroke and the transmission start coordinates and the transmission end coordinates of the second stroke.

14. The control device as claimed in claim 13, wherein the generated second set of plotting instructions further includes the traveling rate from the transmission end coordinates of the first stroke to the transmission start coordinates of the second stroke, and wherein the second waiting time computation unit sets a product of a predetermined residual heat decrease time in which an effect of residual heat on the medium decreases and the traveling rate from the transmission end coordinates of the first stroke to the transmission start coordinates of the second stroke obtained from the generated second set of plotting instructions as the predetermined threshold.

15. A laser projection device comprising:

the control device as claimed in claim 1;

a laser oscillator configured to generate a laser beam;

a direction control mirror configured to control a direction of the generated laser beam; and a direction control motor configured to drive the direction control mirror.

16. A method of forming visible information on a medium by varying transmission of energy applied thereto, the method comprising:

retrieving a set of shape information on the visible information to be plotted to generate a first stroke data set and a second stroke data set each having transmission start coordinates and transmission end coordinates of a corresponding one of the first stroke and second stroke based on the retrieved set of shape information on the visible information to be plotted;

determining a scanning start time of the second stroke by adjusting, when one of first points forming the first stroke made visible by energy scanning based on the first stroke data set and one of second points forming the second stroke made visible, subsequent to the energy scanning of the first stroke, by energy scanning based on the second stroke data set are selected to have a shortest distance therebetween, one of a waiting time to start scanning the second stroke, a traveling rate from the transmission end coordinates of the first stroke to the transmission start coordinates of the second stroke, and respective scanning rates of the first and the second strokes so as to have a desired time interval between scanning the selected one of first points of the first stroke and scanning the selected one of second points of the second stroke;

generating a first set of plotting instructions including the transmission start coordinates and the transmission end coordinates of the first stroke, and a second set of plotting instructions including the scanning start time of the second stroke and the transmission start coordinates and the transmission end coordinates of the second stroke;

storing the generated first set of plotting instructions including the transmission start coordinates and the transmission end coordinates of the first stroke, and the generated second set of plotting instructions including the scanning start time of the second stroke and the transmission start coordinates and the transmission end coordinates of the second stroke; and executing the stored first set of plotting instructions including the transmission start coordinates and the transmission end coordinates of the first stroke, and the stored second set of plotting instructions including the scanning start time of the second stroke and the transmission start coordinates and the transmission end coordinates of the second stroke to plot the visible information on the medium.

* * * * *